US011216054B2

(12) United States Patent
de Cesare et al.

(10) Patent No.: US 11,216,054 B2
(45) Date of Patent: Jan. 4, 2022

(54) TECHNIQUES FOR ADJUSTING COMPUTING DEVICE SLEEP STATES USING ONBOARD SENSORS AND LEARNED USER BEHAVIORS

(71) Applicant: Apple Inc., Cupertino, CA (US)

(72) Inventors: Joshua P. de Cesare, Los Gatos, CA (US); Jonathan J. Andrews, Los Altos Hills, CA (US); Jeffrey R. Wilcox, San Jose, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 16/578,132

(22) Filed: Sep. 20, 2019

(65) Prior Publication Data

US 2020/0012331 A1 Jan. 9, 2020

Related U.S. Application Data

(63) Continuation of application No. 15/817,113, filed on Nov. 17, 2017, now Pat. No. 10,423,212.

(60) Provisional application No. 62/514,745, filed on Jun. 2, 2017.

(51) Int. Cl.
| G06F 1/32 | (2019.01) |
| G06F 1/3231 | (2019.01) |
| G06F 1/3296 | (2019.01) |
| G06Q 10/10 | (2012.01) |
| G06F 1/3203 | (2019.01) |
| H04W 4/02 | (2018.01) |

(52) U.S. Cl.
CPC .......... *G06F 1/3231* (2013.01); *G06F 1/3296* (2013.01); *G06F 1/3203* (2013.01); *G06Q 10/101* (2013.01); *H04W 4/02* (2013.01)

(58) Field of Classification Search
CPC .............................. G06F 1/3231; G06F 1/3296
See application file for complete search history.

(56) References Cited

U.S. PATENT DOCUMENTS

| 6,654,895 B1 * | 11/2003 | Henkhaus ............. G06F 1/3203 710/18 |
| 7,061,366 B2 | 6/2006 | Bell et al. |
| 7,152,172 B2 | 12/2006 | Tsirkel et al. |
| 9,354,727 B2 | 5/2016 | Hughes et al. |
| 9,389,690 B2 | 7/2016 | Li et al. |
| 9,459,682 B2 | 10/2016 | Rajkotia |

(Continued)

*Primary Examiner* — Stefan Stoynov
(74) *Attorney, Agent, or Firm* — Dickinson Wright RLLP

(57) ABSTRACT

This application relates to techniques that adjust the sleep states of a computing device based on user proximity detection procedures. The technique includes detecting a first pattern, using a first subset of sensors of one or more sensors coupled to the computing device, to determine if the object is proximate to the computing device. Provided the first pattern is not indicative of the object being proximate to the computing device, the technique detects a second pattern, using a second subset of sensors of the one or more sensors, to determine if the object is proximate to the computing device. Furthermore, provided either the first pattern or the second pattern is indicative of the object being proximate to the computing device and provided a first portion of a computer system within the computing device is operating within a low-power sleep state, the technique causes the first portion to enter into a high-power sleep state.

20 Claims, 17 Drawing Sheets

(56) References Cited

U.S. PATENT DOCUMENTS

| | | |
|---|---|---|
| 9,746,901 B2 | 8/2017 | Ady et al. |
| 9,959,008 B2 | 5/2018 | Tan et al. |
| 2010/0042857 A1 | 2/2010 | Zommer |
| 2010/0332876 A1* | 12/2010 | Fields, Jr. ............. G06F 9/5094 713/323 |
| 2014/0157026 A1* | 6/2014 | So ......................... G06F 1/3206 713/323 |
| 2017/0140285 A1 | 5/2017 | Dotan-Cohen et al. |
| 2018/0348843 A1 | 12/2018 | de Cesare et al. |

* cited by examiner

TECHNIQUES FOR ADJUSTING COMPUTING DEVICE SLEEP STATES USING ONBOARD SENSORS AND LEARNED USER BEHAVIORS

CROSS-REFERENCE TO RELATED APPLICATIONS

The present application is a continuation of U.S. patent application Ser. No. 15/817,113, entitled "TECHNIQUES FOR ADJUSTING COMPUTING DEVICE SLEEP STATES USING ONBOARD SENSORS AND LEARNED USER BEHAVIORS," filed Nov. 17, 2017, issued Sep. 24, 2019 as U.S. Pat. No. 10,423,212, which claims the benefit of U.S. Provisional Application No. 62/514,745, entitled "TECHNIQUES FOR ADJUSTING COMPUTING DEVICE SLEEP STATES USING ONBOARD SENSORS AND LEARNED USER BEHAVIORS," filed Jun. 2, 2017, the contents of which are incorporated herein by reference in their entirety for all purposes.

FIELD OF INVENTION

The described embodiments relate generally to sleep state adjustment procedures for computing devices. More particularly, the present embodiments relate to techniques that involve adjusting sleep states for a computing device based on the detected proximity of a user using data gathered by one or more sensors coupled to the computing device and/or learned user behavior.

BACKGROUND

In a given conventional computer system, the system can transition between a number of different sleep states based on a duration for which the system remains in a generalized sleep state. For example, as the sleep duration increases, the system can lower or switch off power to different internal components in an effort to promote energy efficiency. For instance, after a first period of sleep time elapses, one system component is powered off, after a second period of sleep time elapses, another system component is powered off, and so on.

Notably, the cost of implementing the foregoing energy saving measures can often result in the system requiring a considerable amount time to re-enter into a fully-functional/awake computing state. In particular, additional time costs can be involved in reanimating the different internal components when the system is abruptly required to re-enter into an awake state (e.g., when a laptop lid is opened, when a power button is pressed, etc.). Consequently, this can be unpleasant for users as they are required to wait for seemingly long periods of time for their systems to enter into an awake state after extended periods of disuse. Furthermore, some environmental safety agencies (e.g., Energy State, Environmental Protection Agency) have established regulations that require certain electronic devices, such as laptops, desktops, mobile devices, etc., to draw less power while idle. Accordingly, such regulations can add further complexity to the development of energy saving measures at the cost of sacrificing user enjoyment of a given electronic device.

SUMMARY OF INVENTION

Accordingly, representative embodiments set forth herein disclose techniques for adjusting sleep states for a computing device based on the detected proximity of a user using data gathered by one or more sensors coupled to the computing device and/or learned user behavior.

One embodiment sets forth a method adjusting sleep states of a computing device based on a proximity of an object relative to the computing device. In particular, the method involves, at the computing device, detecting a first pattern, using a first subset of sensors of one or more sensors coupled to the computing device, to determine if the object is proximate to the computing device. Next, the method involves, provided the first pattern is not indicative of the object being proximate to the computing device, detecting a second pattern, using a second subset of sensors of the one or more sensors, to determine if the object is proximate to the computing device, in which the second subset is different from the first subset. Finally, the method involves the step of, provided either the first pattern or the second pattern is indicative of the object being proximate to the computing device and provided a first portion of a computer system within the computing device is operating within a low-power sleep state, causing the first portion to enter into a high-power sleep state.

Another embodiment sets forth a method to adjust sleep states based on historical user activity. In particular, the method involves the first step of gathering the historical user activity on the computing device when the computing device is in an awake state. Next, the method involves scheduling, based on the historical user activity, a deep sleep signal and a light sleep signal to occur when the computing device is within a sleep state, in which the deep sleep signal causes the computing device to enter into a low-power sleep state, and the light sleep signal causes the computing device to enter into a high-power sleep state. Finally, the method involves the step of issuing the deep sleep signal and the light sleep signal in accordance with the scheduling when the computing device is within the sleep state.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2B-21 illustrate how different onboard sensors/devices can be efficiently used to detect the proximity of a user relative to a computing device, according to some embodiments.

FIG. 5 illustrates a detailed view of a computing device that can be used to implement the various techniques described herein, according to some embodiments.

DETAILED DESCRIPTION

Figure 1:
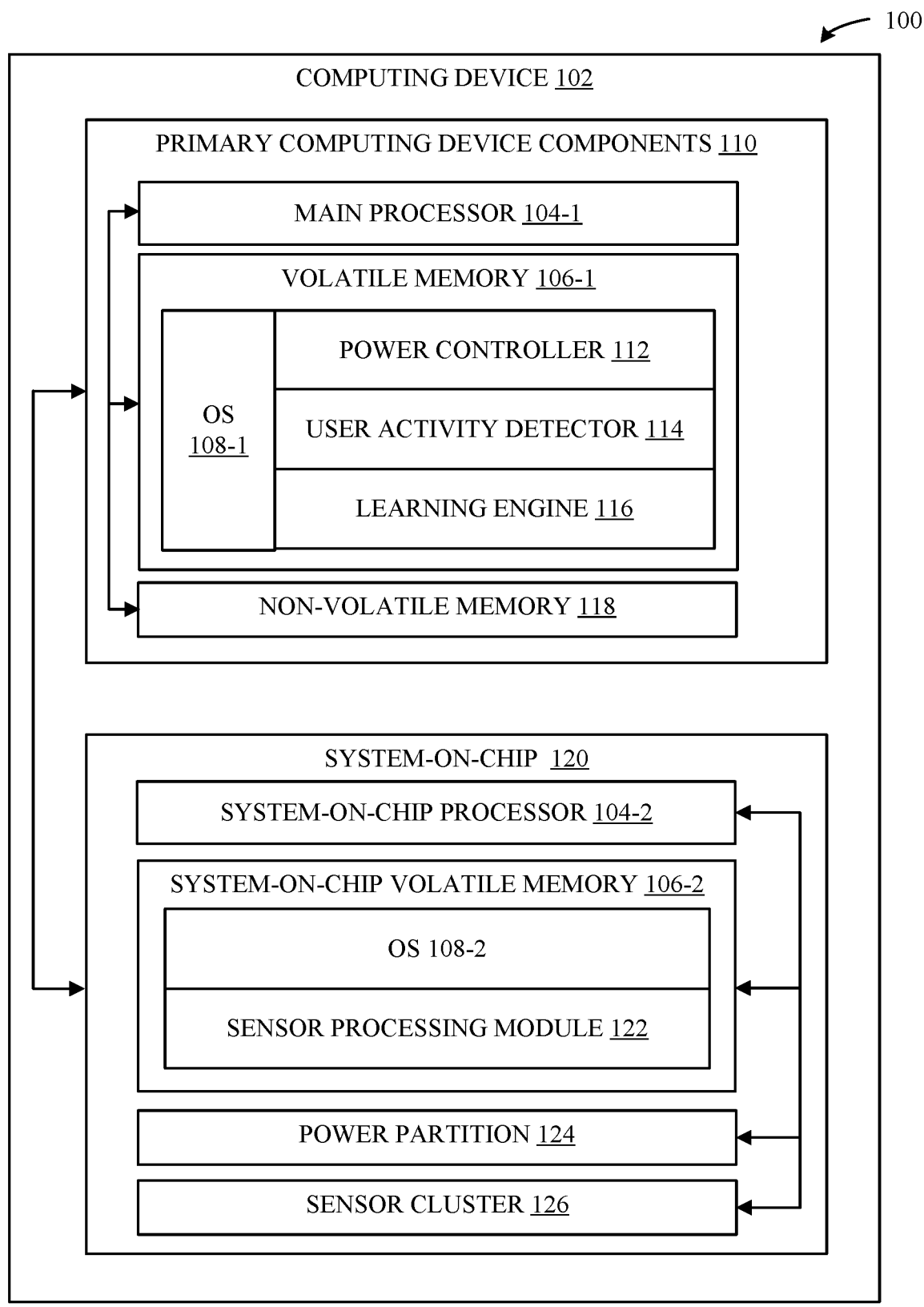
FIG. 1 illustrates an overview of a system that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

The embodiments described herein set forth techniques for adjusting sleep states of a computing device to reduce the amount of time it spends re-entering into a fully-functional/awake computing state. Causes for such unnecessary delays are often due to the considerable amount of time the computing device spends powering on each of the various components of the computing device that were previously placed into sleep states.

The various embodiments set forth herein can avoid these delays, and also meet the energy standards established by different environmental safety agencies, by leveraging the use of different sensors, coupled to the computing device, to determine if a user is nearby and, thus, likely to use the computing device. Sensors that can be coupled to the computing device can include, for example, proximity sensors, light sensors, accelerometers, gyroscopes, microphones, image sensors, and so on. It should be noted that, according to some embodiments, one or more radio signal detection devices can be coupled to the computing device to perform the various procedures described herein. For example, according to some embodiments, using one or more radio signal detection devices coupled to the computing device, the computing device can measure a signal strength of signals emitted from a remote radio device on the user (e.g., an electronic watch worn on the wrist of the user, an electronic phone stored in a shirt/pant pocket, and so on) to determine if the user is nearby. It is noted that any form of signal can be utilized, (e.g., Bluetooth signals, Near Field Communication (NFC) signals, WiFi signals, cellular signals, and so on) to enable the computing device to perform the various proximity detection procedures described herein.

According to some embodiments, each sensor can be coupled to a portion of the computing device that includes a system-on-a-chip ("SOC"). According to some embodiments, the SOC can be associated with memory that is specifically configured for storing data processed by the SOC. The SOC can also be coupled to power resources, resident on the computing device, that enable a portion of the SOC to remain powered on while the remainder of the computing device operates in a low-powered mode. The low-powered mode can be such that the computing device appears to be completely powered off to the user.

As will be described in greater detail herein, each sensor coupled to the SOC can receive a minimum amount of power that is sufficient to enable each sensor to gather data specific to the capabilities of the sensor. Using the data collected by each sensor, powered in the manner described herein, the described embodiments can determine whether a user is near the computing device. Provided the user is determined to be near the computing device, the described embodiments can correspondingly increase power supplied to the various components during a low-power sleep state in a manner that both (1) reduces system latency attributed to the low-power sleep state and (2) quickly restores the computing device to a more active computing state. By restoring the computing device to a more active computing state, while the user is nearby, the user can quickly engage in use of the computing device within a shorter period of time. In a similar fashion, the described embodiments can also determine if a user is not near the computing device based sensor data indicating a lack of proximity between the computing device and the user. In this manner, the embodiments can correspondingly decrease power supplied to the various components during a high-power sleep state in a manner that better conserves power resources given the unlikely event that the user will re-engage in its use based on the lack of proximity.

It should be noted that, for procedures described herein that refer to an increase/decrease of power supplied to various components resident on the computing device, the described embodiments are not limited to changes in an amount of power made available to the computing device. For example, the procedures described herein that refer to the increase/decrease of power supplied to the various components can also include sending control signals that can impact a power/latency ratio associated with the computing device. For instance, according to some embodiments, a sensor processing module, which will be described in greater detail herein, can send control signals to a power controller that can cause the computing device to either (1) move to a power state that has lower power and high system latency or (2) move to a power state that has higher power and lower system latency. As will be described in greater detail herein, the sensor processing module can determine which control signals to send based on data received from the various sensors/devices coupled to the computing device during user proximity determinations.

According to some embodiments, the sensors coupled to the SOC can be logically separated into different sensor groups to perform proximity detection procedures in a manner that promotes even greater power efficiency for the computing device. For example, the described embodiments can group a first subset of sensors that consume power at a lower rate relative to a second subset of sensors. In this fashion, the described embodiments can use data collected by the first set of sensors to make an initial determination as to whether a user is near the computing device. Provided data gathered by the first set of sensors yields inconclusive results, the described embodiments can then activate the higher-power, second set of sensors to collect data to expand upon the initial results provided by the first set of sensors to determine user proximity.

Additionally, the embodiments described herein can also use historical user activity data gathered on the computing device to predict when the user will likely use the computing device. Based on historical user activity data gathered over a period of time, the described embodiments can schedule the issuance of deep sleep signals and light sleep signals when the computing device is within a sleep state which can cause it to immediately enter either a low-power sleep state or a high-power sleep state. It should be noted that the term "deep sleep," as applied herein, is not intended to be limiting and can include a number of different power states that can each be readily understood as associated with a "lowest-powered" sleeping state (that also corresponds with a longer wake-up latency period). "Deep sleep" computing states can include, for example, system power state S4 ("S4") computing states, "hibernate" computing states, and the like. It should also be noted that the term "light sleep," as applied herein, is not intended to be limiting and can include a number of different power states that can each be readily understood as associated with a "highest-powered" sleeping state (that also corresponds with a shorter wake-up latency period). "Light sleep" computing states can include, for example, system power state S2 ("S2") computing states, "stand by" modes, system power state S3 ("S3") computing states, "suspend to ram" modes, and the like.

A more detailed description of the various techniques described herein, and the manner in which they can be implemented, is provided below in conjunction with FIGS. 1, 2A-2F, 3A-3D, and 4-6.

Figure 5:
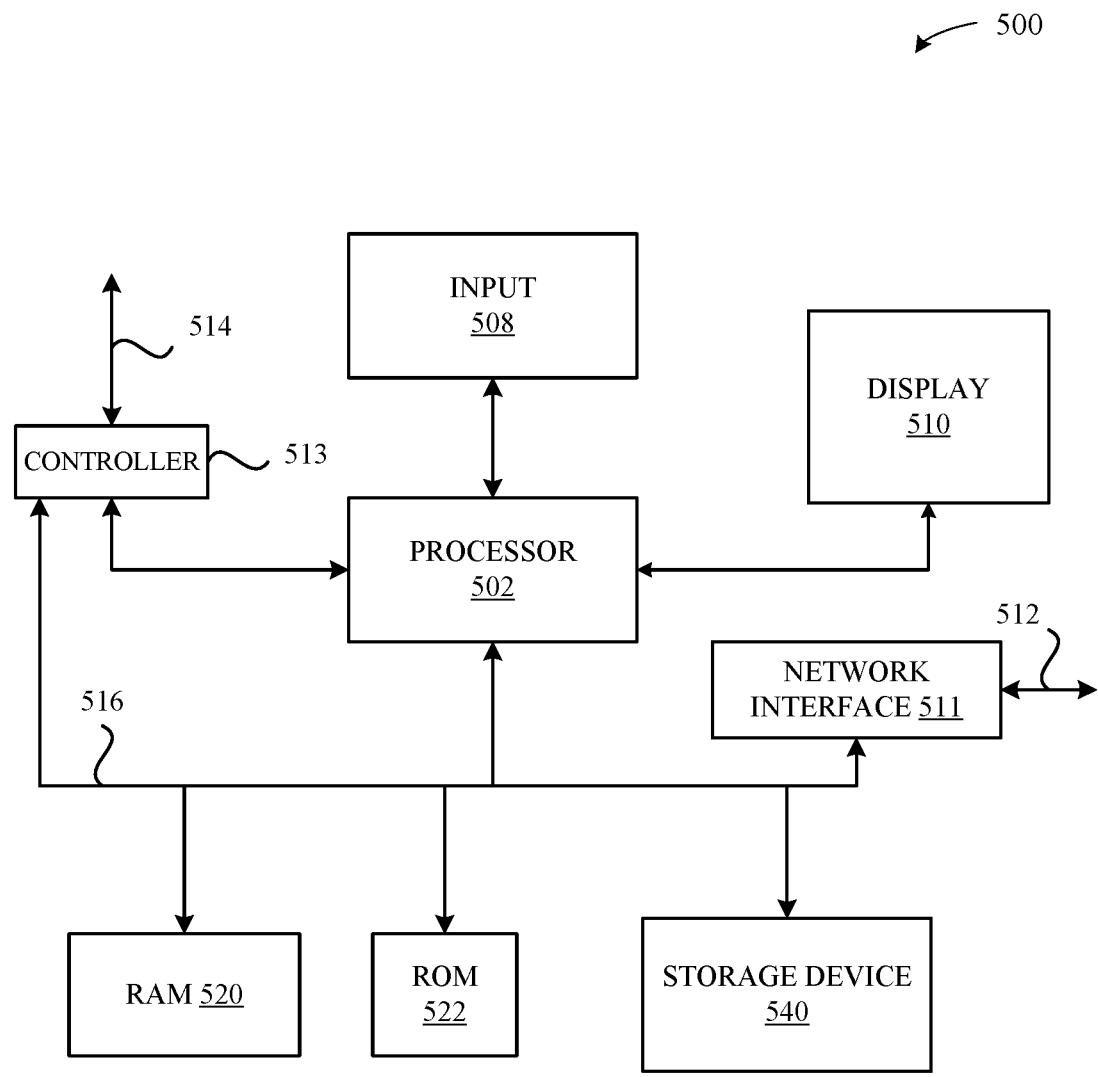

FIG. 1 illustrates a high-level overview 100 of a computing device 102 that can be configured to perform the various techniques described herein. As shown in FIG. 1, the computing device 102 can include one or more primary computing device components 110 which can include a main processor 104-1, a volatile memory 106-1 (e.g., a Random-Access Memory (RAM)), and a non-volatile memory 118 (e.g., a storage device). Additionally, as shown in FIG. 1, the computing device 102 can also include one or more system-on-chips ("SOC") 120, which will be discussed in greater detail herein. It is noted that a more detailed breakdown of example hardware components that can be included in the computing device 102 is illustrated in FIG. 5, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and so on. According to some embodiments, an operating system (OS) 108-1 can be loaded into the volatile memory 106-1, where the OS 108-1 can execute a variety of applications that collectively enable the various techniques described herein to be implemented. As described in greater detail herein, such applications can include a power controller 112, a user activity detector 114, and a learning engine 116.

According to some embodiments, the different sleep states of the computing device 102 can be adjusted by the power controller 112, which can be configured to increase/decrease/cease the power supplied to various components resident on computing device 102 as it operates within the different sleep states. As described in greater detail herein, these sleep states can include, for example, a high-power sleep state, a mid-power sleep state, a low-power sleep state. It is noted that the foregoing sleep states are merely exemplary, and that any number of sleep states can be implemented on the computing device 102 to achieve a desired level of sleep state granularity. According to some embodiments, the power controller 112 can be configured to send/receive control signals from power resource components (not depicted in FIG. 1) that are resident on the computing device 102. For example the power controller 112 can send control signals (not depicted in FIG. 1) to power resource components that are capable of adjusting the operating modes of internal components that can include, for example, processor components, memory components, communications components, bus components, and the like.

As described in greater detail herein, the power controller 112 can be a primary component within the computing device 102 that is configured to manage the sleep states of the computing device 102 based on data gathered/analyzed by the user activity detector 114, and/or the learning engine 116. For example, with respect to the user activity detector 114/learning engine 116, these components can gather/learn user activity associated with the computing device 102, and be utilized by the power controller 112 to appropriately adjust the sleep states of the computing device 102. For example, the power controller 112 can use data gathered by the learning engine 116 to determine that a user is likely to awaken the computing device 102 during an anticipated time window (e.g., when the computing device 102 is in a low or mid sleep state), and correspondingly send control signals to power resource components to heighten the sleep state of the computing device 102 based on (e.g., prior to or during) the anticipated time window. In a similar fashion, the power controller 112 can also determine that a user is not likely to awaken the computing device 102 for a predicted time period (e.g., when the computing device 102 is in a high or mid sleep state), and correspondingly send control signals to power resource components to lower the sleep state of the computing device 102 based on (e.g., prior to or during) the predicted time period.

According to some embodiments, the power controller 112 can issue the above-described control signals to cause the computing device 102 to enter into any desired sleep state level (e.g., low, mid, high, etc.). For example, the power controller 112 can issue control signals to increase or decrease the current sleep state of the computing device 102 by a single level. In another example, the power controller 112 can generate control signals that cause the current sleep state of the computing device 102 to transition into a highest-power sleep state or a lowest-power sleep state while bypassing intermediate sleep states (if any).

According to some embodiments, the highest-power sleep state can represent a state in which the computing device 102 operates prior to entering into an awake (i.e., fully-operable) state. Conversely, the lowest-power sleep state can represent a sleep state in which the computing device 102 operates period to entering into a suspended (e.g., hibernated) state. Again, it is noted that the foregoing sleep states are merely exemplary, and that any number of sleep states—as well as any level of shift in sleep states—can be implemented within the computing device 102. Additionally, as will be discussed in greater detail herein, the power controller 112 can also receive control signals from components on the SOC 120 (e.g., the sensor processing module 122) which can cause the power controller 112 to correspondingly send control signals to power resource components to heighten/lower the sleep state of the computing device 102 based on user proximity detections performed by components resident on the SOC 120. It should be noted that, according to some embodiments, in response to determinations that the user is proximate to the computing device 102 (determined in the manner described herein), the sensor processing module 122 can send control signals to the power controller 112 that cause the computing device 102 to be quickly restored to a fully-awake state. In this fashion, the sensor processing module 122 can send control signals to the power controller 112 that can ultimately restore the computing device 102 to an active computing state, rather than module various sleep levels.

Additionally, and as noted above, the user activity detector 114 can enable the computing device 102 to identify scenarios in which the computing device 102 is likely/not likely to be utilized by a user. According to some embodiments, the user activity detector 114 can include the functionality to detect instances in which a user engages computing device 102 in some manner. For example, the user activity detector 114 can record or capture a number of different user input types capable of being received and processed by the computing device 102. For instance, user activity detector 114 can detect a user providing input to computing device 102 through a wired or wireless keyboard, a wired or wireless mouse, a wired or wireless gamepad, a touch sensitive panel coupled to computing device 102, a touch-sensitive display coupled to computing device 102, and the like. In other examples, the user activity detector 114 can detect motion of the computing device 102 that indicates that a user likely will want to awaken the computing device 102 (e.g., when being pulled out of a carrying case and positioned onto a user's lap). In yet other examples, the user activity detector 114 includes the functionality to detect instances in which a user engages computing device 102 through remote computing mechanisms, such as secure shell ("SSH") connections made to the computing device 102.

Additionally, the user activity detector 114 also includes the functionality to generate historical user activity data based on detected user activities, which can be analyzed by the learning engine 116 to establish meaningful observations about user behaviors. According to some embodiments, the learning engine 116 can be configured to correlate instances of user interactions with computing device 102 with specific time periods to identify typical user usage patterns. The user usage patterns can be gathered over time during a particular threshold time period (e.g., hours, days, months, years, etc.) and utilized by the power controller 112 to implement the user-behavior based sleep state adjustment techniques described herein.

According to some embodiments, components associated with the SOC 120 include the functionality to perform procedures in a similar manner to primary components resident on the computing device 102, such as the main processor 104-1, the volatile memory 106-1 and the non-volatile memory 118. Whereas the primary components of the computing device 102 derive power from a main power source (not depicted in FIG. 1) resident on the computing device 102, components associated with the SOC 120 are generally coupled to a power partition 124.

According to some embodiments, the power partition 124 includes power resources (not depicted in FIG. 1) that can supply power to components coupled thereto at a rate lower than those components typically coupled to the main power source. In this manner, the power partition 124 can provide components coupled thereto with a minimal amount of power such that each component can perform procedures that generally require little processing relative to those components stored in the volatile memory 106-1 (e.g., the power controller 112, the user activity detector 114 and the learning engine 116). As depicted in FIG. 1, components generally coupled to the power partition 124 can include a SOC processor 104-2, SOC, a SOC volatile memory 106-2 and a sensor cluster 126, which will be discussed in greater detail herein in FIGS. 2A-2F.

According to some embodiments, the SOC processor 104-2 can process data associated with components resident within the SOC volatile memory 106-2, including an operating system 108-2 and a sensor processing module 122, which will be discussed in greater detail herein in FIGS. 2A-2F, and store any resultant data produced therein. The SOC processor 104-2 is sufficiently powered by the power partition 124 to process the components resident within the SOC volatile memory 106-2 such that the components resident therein (e.g., the operating system 108-2 and/or the sensor processing module 122) can be responsive while the main processor 104-1 is placed in a "suspend to disk" (or similar) power-state to keep within the regulatory limits described previously.

For example, according to some embodiments, the sensor processing module 122 includes the functionality to communicate with various subsystems included in the SOC 120, including the sensor cluster 126. As will be described in greater detail herein, the sensor processing module 122 can perform a number of different procedures while the main processor 104-1 is placed within a sleep state. For instance, the sensor processing module 122 can monitor data gathered by one or more onboard sensors (depicted in greater detail, for example in FIGS. 2A-2F). The sensor processing module 122 can also communicate control signals to the power controller 112 that can cause the computing device 102 to enter either a higher-power/lower-power sleep state.

It should be appreciated that the various components/modules described herein are not necessarily limited to their respective locations depicted in FIG. 1. For instance, according to some embodiments, the user activity detector 114 and the learning engine 116 can together, or separately in some embodiments, be implemented with the environment of the SOC 120, instead of the computing device 102.

Accordingly, FIG. 1 provides a high-level overview of different hardware/software architectures that can be implemented by computing device 102 in order to carry out the various techniques described herein. A more detailed breakdown of these techniques will now be provided below in conjunction with FIGS. 2A-2F, 3A-3D, and 4-6. It should be noted that in the embodiments and examples set forth herein, a user is generally physically coupled the remote computing devices discussed.

Figure 2A:
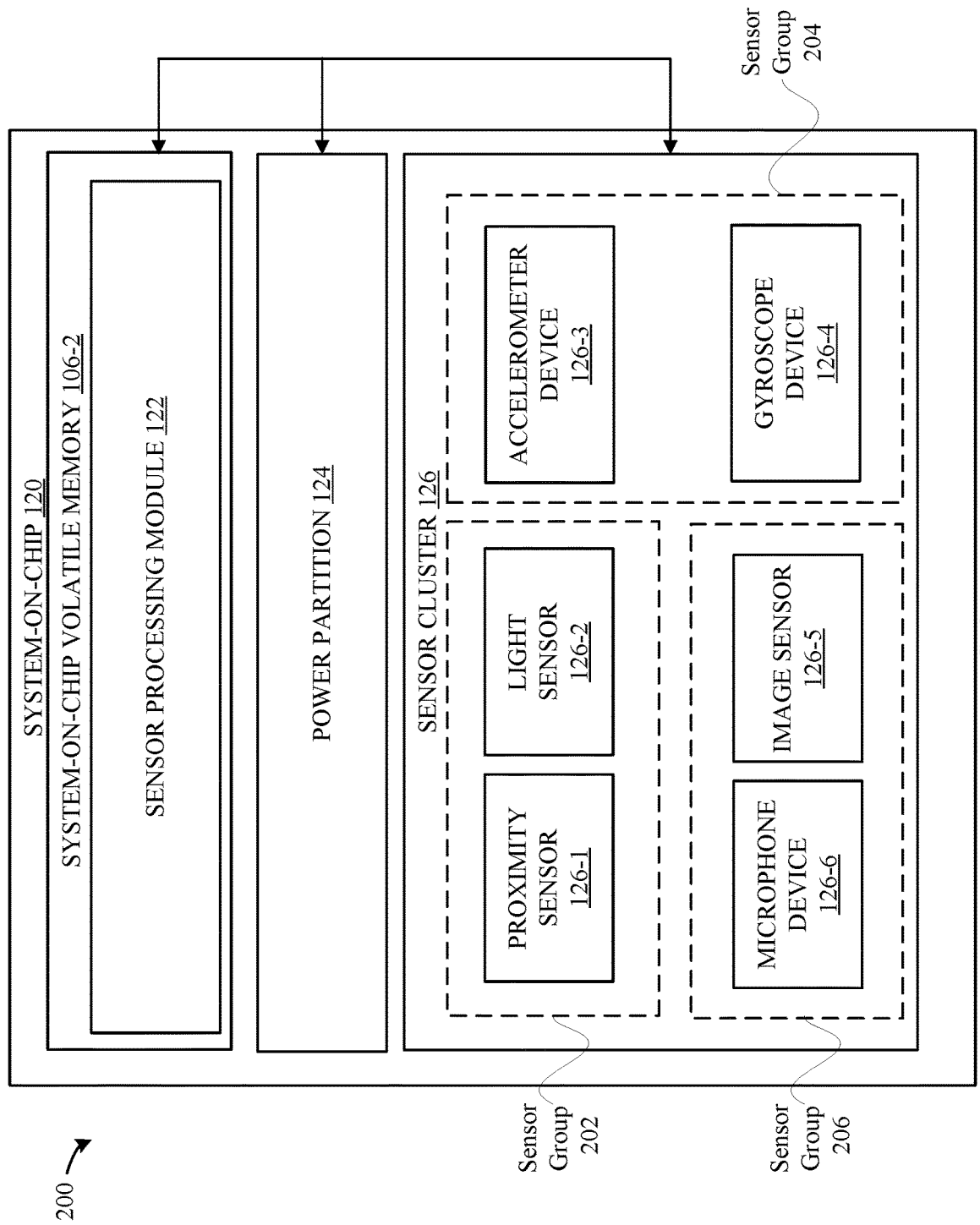
FIG. 2A illustrates an overview of an exemplary system-on-chip ("SOC") system that can be configured to use various onboard sensors/devices to efficiently detect the proximity of a user relative to a computing device, according to some embodiments.

FIG. 2A illustrates an overview of an exemplary system-on-chip ("SOC") system 200 that can be configured to use various onboard sensors/devices to efficiently detect the proximity of a user relative to a computing device 102, according to some embodiments. As illustrated in the SOC 120 in FIG. 2A, the SOC 120 can include the SOC volatile memory 106-2 (which includes the sensor processing module 122), the power partition 124, and the sensor cluster 126. As illustrated in FIG. 2A, the sensor cluster 126 can include one or more onboard sensors/devices such as a proximity sensor 126-1, a light sensor 126-2, an accelerometer device 126-3, a gyroscope device 126-4, an image sensor 126-5 and a microphone device 126-6. The sensors/devices depicted in FIG. 2A are merely exemplary and can include more or less sensors/devices.

It should be noted that the term "proximity sensor," as applied herein, is not intended to be limiting and can include any device that emits one or more electromagnetic beams (e.g., infrared beams) that enable the proximity sensor to recognize changes in (1) the field or (2) by a return signal from an object within a detectable distance of the proximity sensor (e.g., via object deflection). Proximity sensors can include, but are not limited to, capacitive sensors, photoelectric sensors, inductive sensors, and so on. Also, it should be noted that the term "light sensor," as applied herein, is not intended to be limiting and can include any device that senses light or other forms of electromagnetic energy. Light sensors can include, but are not limited to, ambient light sensors, photoelectric sensors, photoemission sensors, thermal sensors, polarization sensors, photochemical sensors, and the like. Additionally, it should be noted that the term "accelerometer device," as applied herein, is not intended to be limiting and can include any device that measures acceleration.

Also, it should be noted that the term "gyroscope device," as applied herein, is not intended to be limiting can include any device that can measure the orientation of a computing device (e.g., computing device 102) relative to another point (e.g., earth). Additionally, it should be noted that the term "microphone device," as applied herein, is not intended to be limiting and can include any device that converts air pressure variation of a sound wave to an electric signal. Also, it should be noted that the term "image sensor," as applied herein, is not intended to be limiting and can include any sensor that conveys information associated with an image acquired by the computing device 102. In this fashion, image sensors can be used in conjunction with a number of electronic devices coupled to the computing device 102 that can include, but are not limited to, digital cameras, camera modules, medical imaging equipment, night vision equipment, and the like.

As will be described in greater detail herein, the sensor processing module 122 can use data collected from the different sensors/devices included in the sensor cluster 126 to make intelligent decisions as to when control signals should be issued, from the sensor processing module 122 to the power controller 112 (not pictured in FIG. 2A), to adjust a current sleep state of the computing device 102. As will be described herein, determinations associated with the issuance of the aforementioned control signals can be based on sensor/device data suggesting that a user is proximate to the computing device 102 and, thus, likely to engage in use of the computing device 102 within a short period of time. In this fashion, the aforementioned control signals can be issued to quickly restore the computing device 102 to a higher-power sleep state in a manner that reduces latency attributed to long wake-up events that occur during sleep-mode operations performed by the computing device 102. Accordingly, using the procedures described herein, the computing device 102 can efficiently conserve power resources until the user is ready to engage in use of the computing device 102.

For example, according to some embodiments, the sensor processing module 122 can use a confidence score to establish that a user is proximate to the computing device 102. Provided the confidence score calculated by the sensor processing module 122 suggests that the user is proximate to the computing device 102, the sensor processing module 122 can correspondingly send control signals to the power controller 112 (not depicted in FIG. 2A) that can cause the computing device 102 to have a current sleep state adjusted to a higher-power sleep state.

According to some embodiments, the confidence score, calculated by the sensor processing module 122, can be derived from data gathered from each sensor/device associated with the sensor cluster 126. For instance, the proximity sensor 126-1, the light sensor 126-2, the accelerometer device 126-3, the gyroscope device 126-4, the image sensor 126-5, and the microphone device 126-4 can each gather data in a manner that enables the sensor processing module 122 to make determinations as to whether a user is proximate to the computing device 102. In this fashion, any data gathered by a sensor/device that suggests that a user is proximate to the computing device 102 can result in a contribution (e.g., added points) to the confidence score. Similarly, data gathered by a sensor/device that suggests that a user is not proximate to the computing device 102 can result in no contribution (e.g., no points added) to the confidence score.

The manner in which the sensor processing module 122 analyzes the confidence score to establish that a user is proximate to the computing device 102 can be based on the respective data produced by each sensor/device of the sensor cluster 126. According to some embodiments, the sensor processing module 122 can compare the number of sensors/devices that contributed to the confidence score against the number of sensors/devices that did not contribute to the contribution score to determine whether control signals should be sent to the power controller 112. For example, according to some embodiments, provided the number of sensors/devices that contributed to the confidence score is greater than the number of sensors/devices that did not contribute, the sensor processing module 122 can correspondingly send control signals to the power controller 112 that can cause the computing device 102 to have a current sleep state adjusted to a higher-power sleep state. Conversely, provided the number of sensors/devices that did not contribute to the confidence score is greater than the number of sensors/devices that did contribute, the sensor processing module 122 can correspondingly withhold the transmission of control signals sent to the power controller 112. According to some embodiments, provided the number of sensors/devices that did not contribute to the confidence score is equal to the number of sensors/devices that did contribute, the sensor processing module 122 can be configured, based on a pre-determined logic (not depicted in FIG. 2A), to either send or withhold the transmission of control signals sent to the power controller 112.

Notably, as will be described in greater detail herein, the sensor processing module 122 can be also configured to make intelligent decisions as to when to activate the different sensors/devices included in the sensor cluster 126 in a manner that enables the computing device 102 to achieve greater power savings. As described herein, the sensor cluster 126 can be coupled to the power partition 124, which enables the proximity sensor 126-1, the light sensor 126-2, the accelerometer device 126-3, the gyroscope device 126-4, the image sensor 126-5 and/or the microphone device 126-6 to receive power from the power partition 124. Thus, each of the aforementioned sensors/devices can receive a minimal amount of power that is sufficient to enable each sensor/device to gather data specific to the capabilities of the sensor/device.

Accordingly, rather than activating each sensor/device included in the sensor cluster 126 to make user proximity determinations, in some embodiments, the sensor processing module 122 can instead conserve power resources by selectively activating a subset of the sensors/devices to determine whether a user is approaching the computing device 102. However, should the results of the data, produced by the subset, yield inconclusive results with respect to user proximity then, according to some embodiments, the sensor processing module 122 can selectively activate additional sensors/devices to gather more data in order to make a more informed decision as to whether control signals should be sent to the power controller 112. By utilizing only a subset of the sensors/devices in the manner described, the sensor processing module 122 can enable the power partition 124 to conserve more power by not requiring the power partition 124 to unnecessarily supply power to sensors/devices that are not required to be in use for purposes of making user proximity determinations. Indeed, the power partition 124 can conserve more power during scenarios in which a small portion of data, produced by a subset of the sensors/devices included in the sensor cluster 126, can suggest that a user is likely not proximate to the computing device 102.

According to some embodiments, the sensor processing module 122 can also group together different sensors/devices to enable the sensor processing module 122 to make informed decision regarding the issuance of control signals, sent by the sensor processing module 122 to the power controller 112, yet also limit the number of sensors/devices that need to be activated in order to conserve power resources. According to some embodiments, the sensor processing module 122 can group a set of sensors/devices based on a particular function. For instance, according to one embodiment, a first sensor group can be configured to detect physical movement that is external to the computing device 102 (e.g., the proximity sensor 126-1, the light sensor 126-2, and the like); a second sensor group can be configured to detect movement with respect to the computing device 102 (e.g., the accelerometer device 126-3, the gyroscope 126-4, and the like); a third group can be configured to detect more refined human features/behaviors (e.g., e.g., the image sensor 126-5, the microphone device 126-6, and the like), and so on. For instance, as illustrated in FIG. 2A, each of the sensors/devices included in the sensor cluster 126 can be associated with a respective sensor group (e.g., sensor groups 202, 204 and 206).

Additionally, according to some embodiments, each sensor/device of the sensor cluster 126 can consume a respective amount of power from the power partition 124 to perform an operation that is specific to the sensor/device. According to some embodiments, the proximity sensor 126-1 and the light sensor 126-2 can each consume respective power amounts that are comparable to each other (i.e., the proximity sensor 126-1 and the light sensor 126-2 can consume similar amounts of power from the power partition 124). According to some embodiments, the respective power consumption amounts of the proximity sensor 126-1 and the light sensor 126-2, in the aggregate, can be less than the individual amounts of power consumed by the accelerometer device 126-3, the gyroscope device 126-4, the image sensor 126-5 and/or the microphone device 126-6, respectively. Therefore, in addition to similar functions, the proximity sensor 126-1 and the light sensor 126-2 can be grouped together to form the sensor group 202 based on similar power usage traits as well.

Additionally, according to some embodiments, the accelerometer device 126-3 and the gyroscope device 126-4 can each consume respective power amounts that are comparable to each other. According to some embodiments, the respective power consumption amounts of the accelerometer device 126-3 and the gyroscope device 126-4, in the aggregate, can be less than the individual amounts of power consumed by the image sensor 126-5 and/or the microphone device 126-6, but more than the sensors included in the sensor group 202. Therefore, in addition to similar functions, the accelerometer device 126-3 and the gyroscope device 126-4 can be grouped together to form the sensor group 204 based on similar power usage traits as well.

Furthermore, according to some embodiments, the image sensor 126-5 and the microphone device 126-6 can each consume respective power amounts that are comparable to each other. According to some embodiments, the respective power consumption amounts of the image sensor 126-5 and the microphone device 126-6, in the aggregate, can be more than the sensors/devices included in either the sensor group 202 or the sensor group 204. Therefore, in addition to similar functions, the image sensor 126-5 and the microphone device 126-6 can be grouped together to form the sensor group 206 based on similar power usage traits as well. As will be described in greater detail in FIG. 2B, sensor groups 202, 204, and 206 can enable a sufficient amount of data to be produced from the respective sensors/devices included therein, yet also limit the number of sensors/devices that the sensor processing module 122 needs to activate in order to enable the power partition 124 to conserve power resources.

Figure 2B:
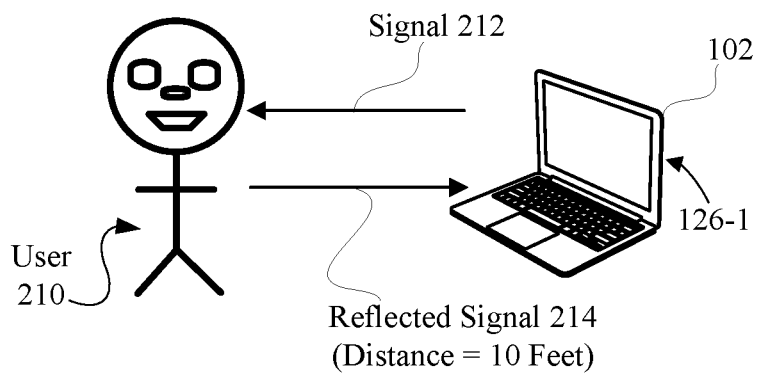
Figure 2B:
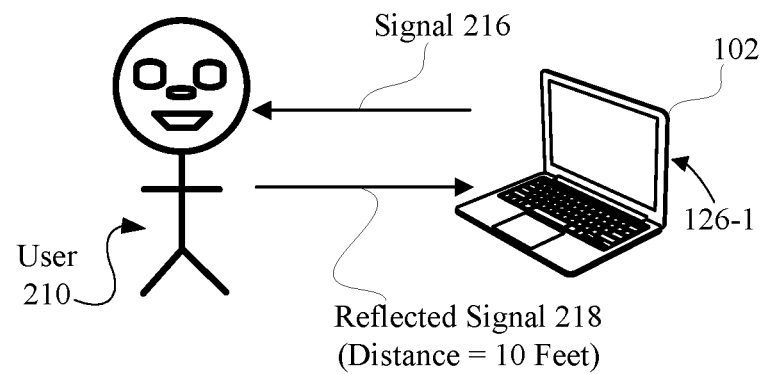
Figure 2C:
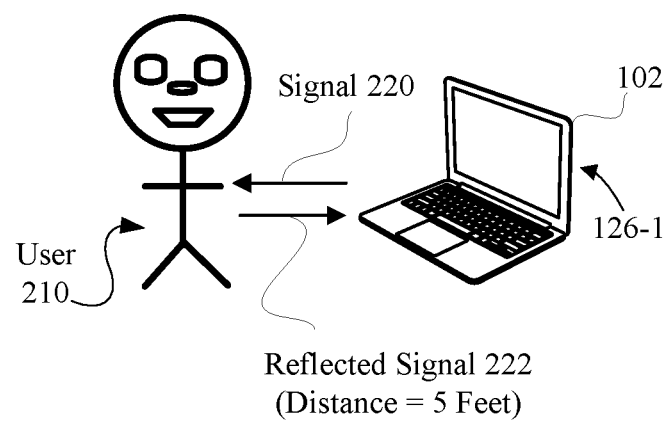

FIGS. 2B-2I illustrate how different onboard sensors/devices can be efficiently used to perform user proximity detection procedures, according to some embodiments. FIGS. 2B-2C illustrate how the proximity sensor 126-1 can be used to detect the proximity of a user relative to the computing device 102, according to some embodiments. As illustrated in FIG. 2B, the proximity sensor 126-1 (depicted as installed within the computing device 102) can perform proximity sensor detection procedures 208 which can be performed at different times, times one (1) and two (2). The duration between times one (1) and two (2) can be milliseconds, seconds, minutes, and so on. Additionally, the proximity sensor 126-1 can be configured to transmit multiple signals (e.g., signals 212 and 214) that can be used to determine whether a user 210 is approaching the computing device 102.

For instance, during time one (1), the proximity sensor 126-1 can transmit the signal 212 which causes a reflected signal 214 (produced as a result of object deflection from the body of user 210) to be reflected from the user 210 back to the proximity sensor 126-1. Upon receipt of the reflected signal 214, the proximity sensor 126-1 can calculate how far the user 210 is relative to the computing device 102. For example, at time one (1), when the proximity sensor detection procedures 208 are performed, a calculation of the time to transmit the signal 212 (from the proximity sensor 126-1) and subsequent receipt of reflected signal 214 (by the proximity sensor 126-1) can result in the proximity sensor 126-1 calculating a distance value for the reflected signal 214.

As illustrated in FIG. 2B, the proximity sensor 126-1 can calculate a distance value of ten (10) feet for the reflected signal 214, thereby indicating that, at time one (1), the user 210 is ten (10) feet away from the computing device 102. Upon completion of the distance calculations, the proximity sensor 126-1 can communicate the distance value data of the reflected signal 214 to the sensor processing module 122 (not depicted in FIG. 2B). According to some embodiments, upon receipt of the distance value data for the reflected signal 214, from the proximity sensor 126-1, the sensor processing module 122 can determine that additional distance value calculations are needed from the proximity sensor 126-1 to determine whether the user 210 is approaching the computing device 102. In this fashion, the sensor processing module 122 can issue controls that request the proximity sensor 126-1 to gather more data.

For instance, with reference to the performance of proximity sensor detection procedures 208 at time two (2) in FIG. 2B, the proximity sensor 126-1 can calculate a new distance value for a new reflected signal, reflected signal 218, which was received by the proximity sensor 126-1 after transmitting signal 216 at time two (2). For instance, at time two (2), when the proximity sensor detection procedures 208 are performed, a calculation of the time to transmit the signal 216 (from the proximity sensor 126-1) and subsequent receipt of the reflected signal 218 (by the proximity sensor 126-1) can result in the proximity sensor 126-1 calculating a distance value of ten (10) feet for the reflected signal 218. Upon completion of the distance calculations, the proximity sensor 126-1 can communicate the distance value data of the reflected signal 218 to the sensor processing module 122.

During analysis of the distance value data for the reflected signal 218, the sensor processing module 122 can determine that the lack of change in the distance value data received from the proximity sensor 126-1 is indicative of the user 210 not approaching the computing device 102 to engage in use of the computing device 102. Accordingly, the sensor processing module 122 can store data associated with the results of determinations made with respect to the user approaching the computing device 102 in the SOC volatile memory 106-2 (e.g., in a data structure configured to store the results of the determinations made by the sensor processing module 122).

FIG. 2C depicts an alternative scenario in which data produced by the proximity sensor 126-1 suggests that the user 210 is approaching the computing device 102. For example, with reference to the performance of proximity sensor detection procedures 208 at time two (2) in FIG. 2C, the proximity sensor 126-1 can calculate a new distance value for a new reflected signal, reflected signal 222, which was received by the proximity sensor 126-1 after transmitting signal 220 at time two (2). For instance, at time two (2), when the proximity sensor detection procedures 208 are performed, a calculation of the time to transmit the signal 220 (from the proximity sensor 126-1) and subsequent receipt of the reflected signal 222 (by the proximity sensor 126-1) can result in the proximity sensor 126-1 calculating a distance value of five (5) feet for the reflected signal 222, thereby indicating that, at time two (2), the user 210 is now five (5) feet away from the computing device 102. Upon completion of the distance value calculations, the proximity sensor 126-1 can communicate the distance value data of the reflected signal 222 to the sensor processing module 122. During analysis of the distance value data for the reflected signal 222, the sensor processing module 122 can determine that decrease in distance between the proximity sensor 126-1 and the user 210 is indicative of the user 210 approaching the computing device 102 to engage in use of the computing device 102. Accordingly, the sensor processing module 122 can store data associated with the results of determinations made with respect to the user approaching the computing device 102 in the SOC volatile memory 106-2.

Figure 2D:
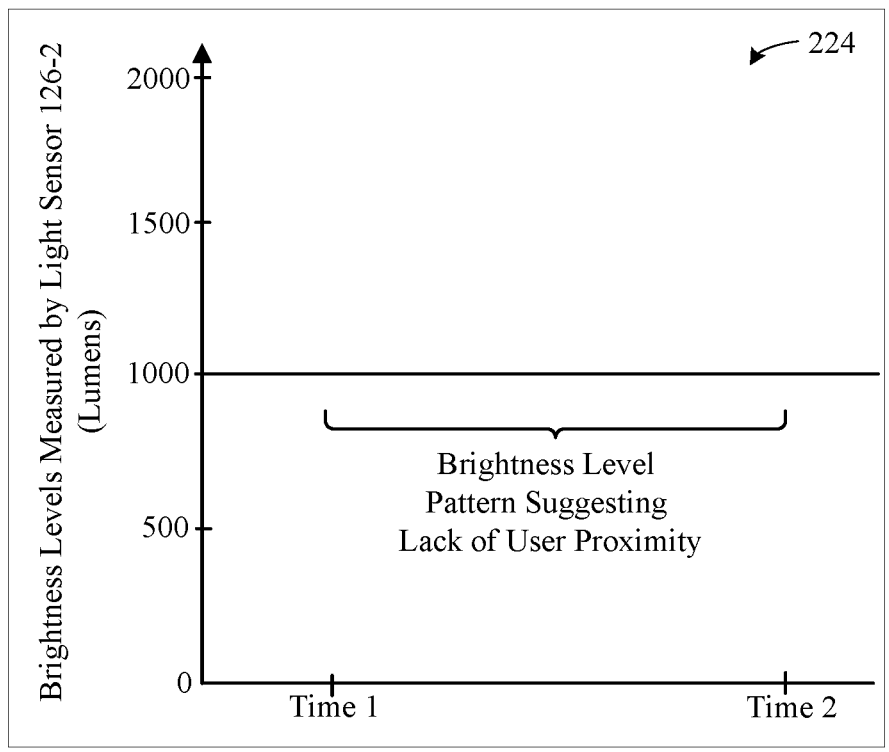
Figure 2D:
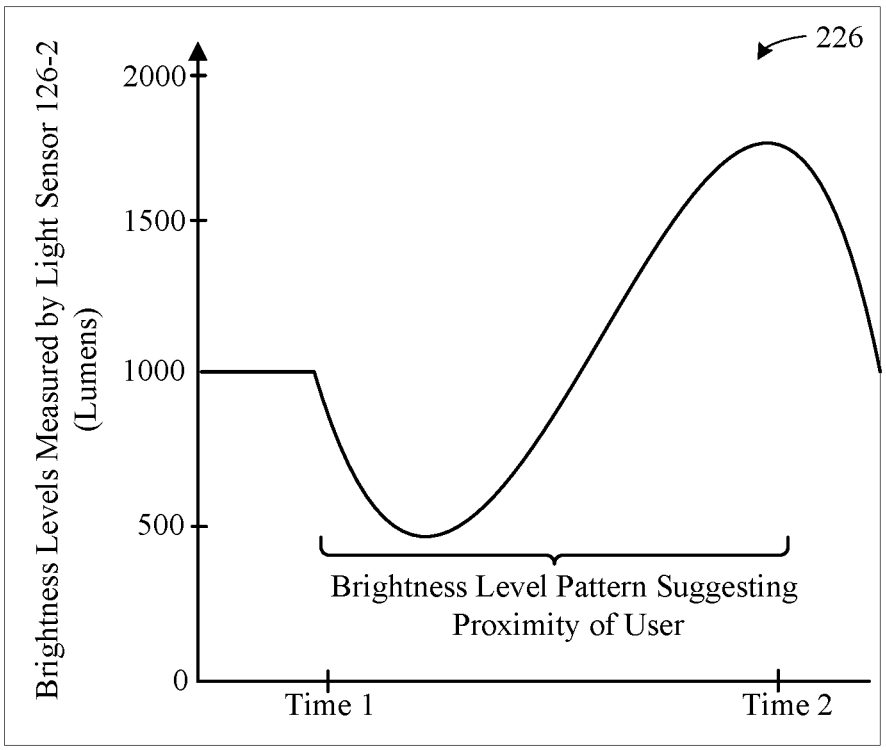

As will be depicted in greater detail in FIG. 2D, the sensor processing module 122 can selectively activate the light sensor 126-2 which is also associated with the sensor group 202, to gather more data to make a more informed decision as to whether the user 210 is approaching the computing device 102. Additionally, by specifically activating the light sensor 126-1, the sensor processing module 122 also minimizes the number of sensors/devices that are used for user proximity determinations by not activating additional sensors/devices included in other sensor groups, such as sensor groups 204 and 206, to gather data at this point, thereby promoting efficient power usage.

FIG. 2D presents different graphical illustrations of additional sensor/device data that can be efficiently used for user proximity detection procedures, according to some embodiments. FIG. 2D continues the exemplary scenario described in FIG. 2B, in which the sensor processing module 122 determined that the lack of change in the distance value data received from the proximity sensor 126-1 is indicative of the user 210 not approaching the computing device 102 to engage in use of the computing device 102. As previously described herein, the light sensor 126-2 can be activated, by the sensor processing module 122 (not depicted in FIG. 2D), to gather additional sensor data to further determine whether the user 210 is approaching the computing device 102.

As illustrated in light sensor graphical data 224 in FIG. 2D, along the y-axis, the light sensor 126-2 can measure various levels of brightness and, along the x-axis, collect brightness level data for any duration of time (e.g., milliseconds, seconds, minutes, and so on). As depicted between times one (1) and two (2), the light sensor 126-2 can measure a constant level of brightness, thereby producing data that suggests that a user is likely not approaching the computing device 102. During analysis of the data produced by the light sensor 126-2, the sensor processing module 122 can determine that the linear nature of the light intensity values, as indicated between times one (1) and two (2), is consistent with the user 210 not approaching the computing device 102 and, thus, not likely to engage in use of the computing device 102. Accordingly, the sensor processing module 122 can store data associated with the results of determinations made with respect to the user approaching the computing device 102 in the SOC volatile memory 106-2

Based on produced data, by both the proximity sensor 126-1 and the light sensor 126-2, that each suggested that the user 210 is not approaching the computing device 102, the sensor processing module 122 can withhold the transmission of control signals sent to the power controller 112. For instance, according to some embodiments, the sensor processing module 122 can recognize that all of the sensors, included in the sensor group 202, produced data that suggested that the user 210 is not approaching the computing device 102. The recognition of this pattern, detected by the sensor processing module 122, can cause the sensor processing module 122 to predict that other sensors/devices would likely arrive at the same results as the proximity sensor 126-1 and the light sensor 126-2, had the sensors/devices been activated.

Based on recognition of the pattern, the sensor processing module 122 can conserve power resources by deactivating/not activating the sensors/devices included in the sensor groups 204 and 206 to prevent them from performing any procedures until further instructions are provided by the sensor processing module 122. Accordingly, at this point, the sensor processing module 122 can determine that no additional data is required from any sensors/devices associated with the sensor groups 204 and 206. In this fashion, the sensor processing module 122 can withhold the transmission of control signals sent to the power controller 112, thereby causing the computing device 102 to remain with a current sleep state level.

Light sensor graphical data 226 in FIG. 2D depicts an alternative scenario in which data produced by the light sensor 126-2 suggests that the user 210 is approaching the computing device 102. For example, the light sensor 126-2 can detect that, between times one (1) and two (2), the brightness level values oscillate between approximately the 500-1800 lumen range. In this manner, the sudden pattern of darkness, followed by light, then darkness again can be indicative of the user 210 approaching the computing device 102 to engage in use of the computing device 102. In this fashion, the sensor processing module 122 can determine that the non-linear nature of the brightness values, as indicated between times one (1) and two (2), is consistent with the user 210 approaching the computing device 102 to engage in use of the computing device 102.

Given the inconsistencies in the data suggested by the proximity sensor 126-1 (which produced data that suggested that the user 210 is not approaching the computing device 102) and the data suggested by the light sensor 126-2, the sensor processing module 122 can decide to gather more data from other sensor groups (e.g., the sensor groups 204 and 206). According to some embodiments, the sensor processing module 122 can select the sensor group 204 given that, as described herein, the level of power consumed by the accelerometer device 126-3 and the gyroscope device 126-4 can be generally lower than the level of power consumed by the image sensor 126-5 and the microphone device 126-6. In this fashion, the sensor processing module 122 can gather data from the sensor group 204 to make a more informed determination as to whether the user 210 is approaching the computing device 102. Accordingly, the sensor processing module 122 can send control signals to the sensor group 204 that activate sensors/devices within the sensor group 204 to collect more data.

In a scenario in which the data produced by both the proximity sensor 126-1 and the light sensor 126-2 suggests that the user 210 is approaching the computing device 102, according to some embodiments, the sensor processing module 122 can correspondingly send control signals to the power controller 112 (not depicted in FIG. 2D) that can cause the computing device 102 to have a current sleep state adjusted to a higher-power sleep state. According to some embodiments, the adjustment to the higher-power sleep state can supply sufficient power to the power controller 112 to enable one or more components executing within the volatile memory 106-1 (not depicted in FIG. 2D) to perform a corresponding operation.

For example, according to some embodiments, the operating system 108-1 can be configured to use data produced by the proximity sensor 126-1 and/or the light sensor 126-2 during the procedures described herein (e.g., FIGS. 2B-2D) to perform a corresponding operation. For instance, according to some embodiments, with reference to FIGS. 2B-2C, the operating system 108-1 can be configured to use the distance/brightness values calculated by the proximity sensor 126-1/the light sensor 126-2 to perform wake-up operations as the user 210 gets closer to the computing device 102. In this fashion, the control signals sent to the power controller 112, from the sensor processing module 122, can be used to reduce latencies that are caused by wake events performed by the operating system 108-1.

Figure 2E:
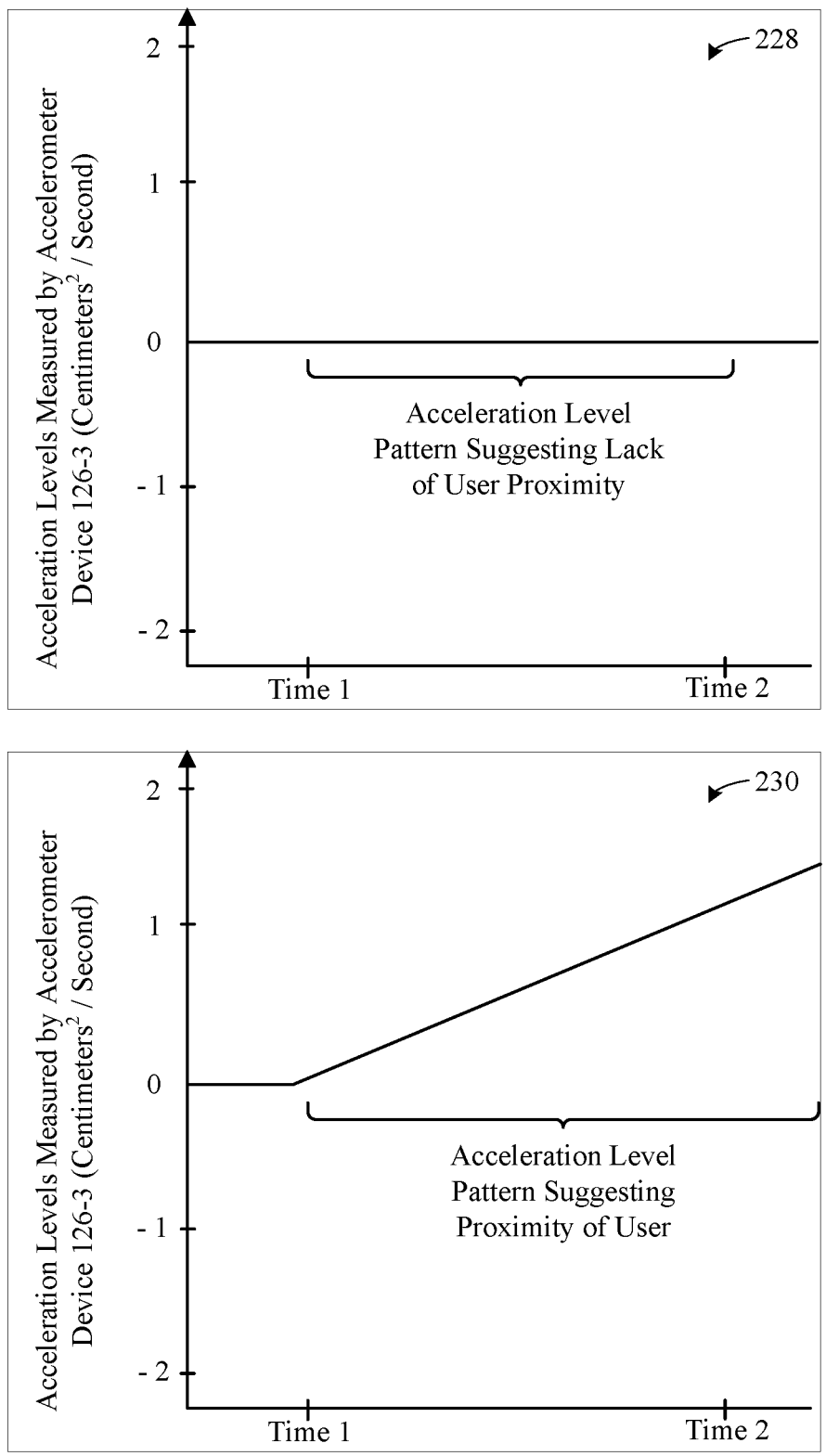

FIG. 2E presents different graphical illustrations of additional sensor/device data that can be efficiently used to perform user proximity detection procedures, according to some embodiments. FIG. 2E continues the exemplary scenario described in FIG. 2D, in which the inconsistencies between the data produced by the proximity sensor 126-1 and the light sensor 126-2 resulted in the activation, by the sensor processing module 122, of the sensor group 204 to gather more data. As previously described herein, the accelerometer device 126-3 can be activated, by the sensor processing module 122 (not depicted in FIG. E), to gather additional data to determine whether the user 210 is approaching the computing device 102.

With reference now to the accelerometer graphical data 228 in FIG. 2E, along the y-axis, the accelerometer device 126-3 device can measure various levels of acceleration and, along the x-axis, collect acceleration level data for any duration of time (e.g., milliseconds, seconds, minutes, and so on). As depicted between times one (1) and two (2), the accelerometer device 126-3 can measure a constant level of acceleration, thereby indicating that the computing device 102 is likely not being lifted, by the user 210, from a previous position for purposes of engaging in the use of the computing device 102.

Consider, for example, a scenario in which the user places the computing device 102 on a flat surface, such as a countertop or table. While the computing device 102 remains atop the surface of the countertop or table, a graphical representation of the data collected by the accelerometer device 126-3 during that period can be similar to the data depicted between times one (1) and two (2) in the accelerometer graphical data 228. In this fashion, the sensor processing module 122 can determine that the linear nature of the acceleration values, as indicated between times one (1) and two (2), is consistent with the user 210 not approaching the computing device 102 and, thus, not likely to engage in use of the computing device 102. Accordingly, the sensor processing module 122 can store data associated with the determination in the SOC volatile memory 106-2.

Accelerometer graphical data 230 in FIG. 2E depicts an alternative scenario in which data produced by the accelerometer device 126-3 suggests that the user 210 is proximate to the computing device 102. For example, the accelerometer device 126-3 can detect that, between times one (1) and two (2), the acceleration level steadily increases from approximately 0 to 1.5 (centimeters2/second). With further reference to the acceleration data scenario described herein, the sudden increase in acceleration can be indicative of a user lifting the computing device 102 from the countertop or table to a position near the head of the user, such as the ear or mouth of the user, to engage in use of the computing device 102 (e.g., engage in use of a phone application installed on the computing device 102). In this fashion, the sensor processing module 122 can determine that the sudden change in acceleration levels is consistent with the user 210 approaching the computing device 102 to engage in use of the computing device 102. Accordingly, the sensor processing module 122 can store data associated with the determination in the SOC volatile memory 106-2.

Figure 2F:
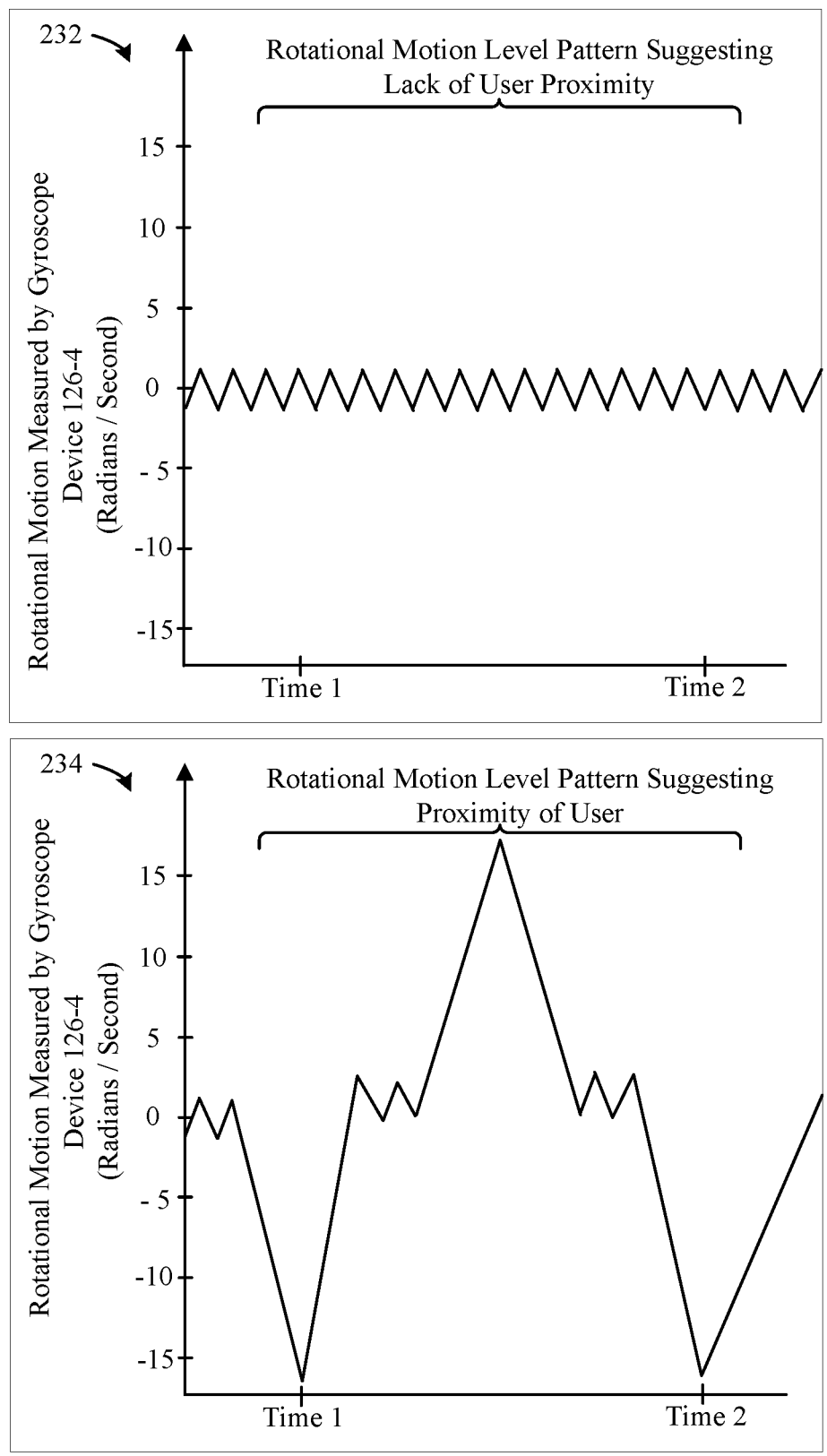

As will be depicted in greater detail in FIG. 2F, the sensor processing module 122 can selectively activate the gyroscope device 126-4 which is also associated with the sensor group 204, to gather more data to make a more informed decision as to whether the user 210 is approaching the computing device 102. Additionally, by specifically activating the gyroscope device 126-4, the sensor processing module 122 also minimizes the number of sensors/devices that are used for user proximity determinations by not activating additional sensors/devices included in other sensor groups, such as sensor groups 202 and 206, to gather data at this point, thereby promoting efficient power usage.

FIG. 2F presents different graphical illustrations of additional sensor/device data that can be efficiently used for user proximity detection procedures, according to some embodiments. FIG. 2F continues the exemplary scenario described in FIG. 2E, in which the sensor processing module 122 activated the gyroscope device 126-4 to gather additional sensor data to further determine whether the user 210 is approaching the computing device 102. As illustrated in gyroscope graphical data 232 in FIG. 2F, along the y-axis, the gyroscope device 126-4 can measure the rotational speed/angular velocity (in radians/second) and, along the x-axis, collect the rotational speed data for any duration of time (e.g., milliseconds, seconds, minutes, and so on).

As depicted between times one (1) and two (2), the gyroscope device 126-4 can measure a constant rotational speed rate, thereby indicating that the orientation of the computing device 102 has not changed relative to a previous orientation detected by the gyroscope device 126-4 for the computing device 102. Consider, for example, a scenario (similar to the one discussed in association with the accelerometer device 126-3 described previously herein), in which the user places the computing device 102 on a flat surface, such as a countertop or table. While the computing device 102 remains atop the surface of the countertop or table, a graphical representation of the data collected by the gyroscope device 126-4 during that period can be similar to the data depicted between times one (1) and two (2) in the gyroscope graphical data 232. In this fashion, the sensor processing module 122 can determine that the non-linear nature of the orientation measurement values, as indicated between times one (1) and two (2), is consistent with the user 210 not approaching the computing device 102 and, thus, unlikely to engage in use of the computing device 102 within a short period of time. Accordingly, the sensor processing module 122 can store data associated with the determination in the SOC volatile memory 106-2.

Based on produced data, by both the accelerometer device 126-3 and the gyroscope device 126-4, that each suggested that the user 210 is not approaching the computing device 102, the sensor processing module 122 can withhold the transmission of control signals sent to the power controller 112. For instance, according to some embodiments, the sensor processing module 122 can recognize that all of the sensors, included in the sensor group 204, produced data that suggested that the user 210 is not approaching the computing device 102. The recognition of this pattern, detected by the sensor processing module 122, can cause the sensor processing module 122 to predict that other sensors/devices would likely arrive at the same results as accelerometer device 126-3 and the gyroscope device 126-4, had the sensors/devices been activated.

Based on recognition of the pattern, the sensor processing module 122 can conserve power resources by deactivating/ not activating the sensors/devices included in sensor groups 202 and 206 to prevent them from performing any procedures until further instructions are provided by the sensor processing module 122. Accordingly, at this point, the sensor processing module 122 can determine that no additional data is required from any sensors/devices associated with the sensor groups 202 and 206. In this fashion, the sensor processing module 122 can withhold the transmission of control signals sent to the power controller 112, thereby causing the computing device 102 to remain with a current sleep state level.

Gyroscope graphical data 234 in FIG. 2F depicts an alternative scenario in which data produced by the gyroscope device 126-4 suggests that a user is proximate to the computing device 102. For example, as depicted between times one (1) and two (2) in the gyroscope graphical data 234 in FIG. 2F, the data collected by the gyroscope device 126-4 can indicate that the orientation of the computing device 102 oscillated between approximately −15 (radians/second) and 15 (radians/second), thereby producing data indicative of a user lifting the computing device 102 from the countertop or table and/or rotating the orientation of the computing device, to possibly view content being displayed on the computing device 102 (e.g., watching a video/reading an article via a display device coupled to the computing device 102). In this fashion, the sensor processing module 122 can determine that the sudden change in orientation is consistent with a user approaching the computing device 102 to engage in use of the computing device 102. Accordingly, the sensor processing module 122 can store data associated with the results of determinations made with respect to the user approaching the computing device 102 in the SOC volatile memory 106-2.

Given the inconsistencies in the data suggested by the accelerometer device 126-3 (which produced data that suggested that the user 210 is not approaching the computing device 102) and the data suggested by the gyroscope device 126-4, the sensor processing module 122 can decide to gather more data from other sensor groups (e.g., the sensor group 206). According to some embodiments, the sensor processing module 122 can select the sensor group 206 to enable the sensor processing module 122 to selectively utilize the higher-power features provided by sensors/devices associated with the sensor group 206 (e.g., the human facial detection and/or human voice recognition capabilities of the image sensor 126-5 and the microphone device 126-6, respectively). In this fashion, the sensor processing module 122 can gather data from the sensor group 206 to make a more informed determination as to whether the user 210 is approaching the computing device 102. Accordingly, the sensor processing module 122 can send control signals to the sensor group 206 that can enable the sensor processing module 122 to analyze data received from the image sensor 126-5 and/or the microphone device 126-6.

In a scenario in which the data produced by both the accelerometer device 126-3 and the gyroscope device 126-4 suggests that the user 210 is approaching the computing device 102, according to some embodiments, the sensor processing module 122 can correspondingly send control signals to the power controller 112 (not depicted in FIG. 2D) that can cause the computing device 102 to have a current sleep state adjusted to a higher-power sleep state. According to some embodiments, the adjustment to the higher-power sleep state can supply enough power to the power controller 112 to enable one or more components executing within the volatile memory 106-1 (not depicted in FIG. 2F) to perform a corresponding operation.

For example, according to some embodiments, the operating system 108-1 can be configured to use data produced by the accelerometer device 126-3 and/or the gyroscope device 126-4 during the procedures described herein (e.g., FIGS. 2E-2F) to perform a corresponding operation. For instance, according to some embodiments, with reference to FIGS. 2E-2F, the operating system 108-1 can be configured to use the acceleration/rotational motion values calculated by the accelerometer device 126-3/gyroscope device 126-4 to provide real-time computing device 102 orientation details to one or more devices capable of processing the data. In this fashion, the control signals sent to the power controller 112, from the sensor processing module 122, can be used to allow one or more applications, resident in the volatile memory 106-1 to receive period data updates that can be efficiently processed by one or more applications once the computing device 102 is restored a fully-operational mode.

Figure 2G:
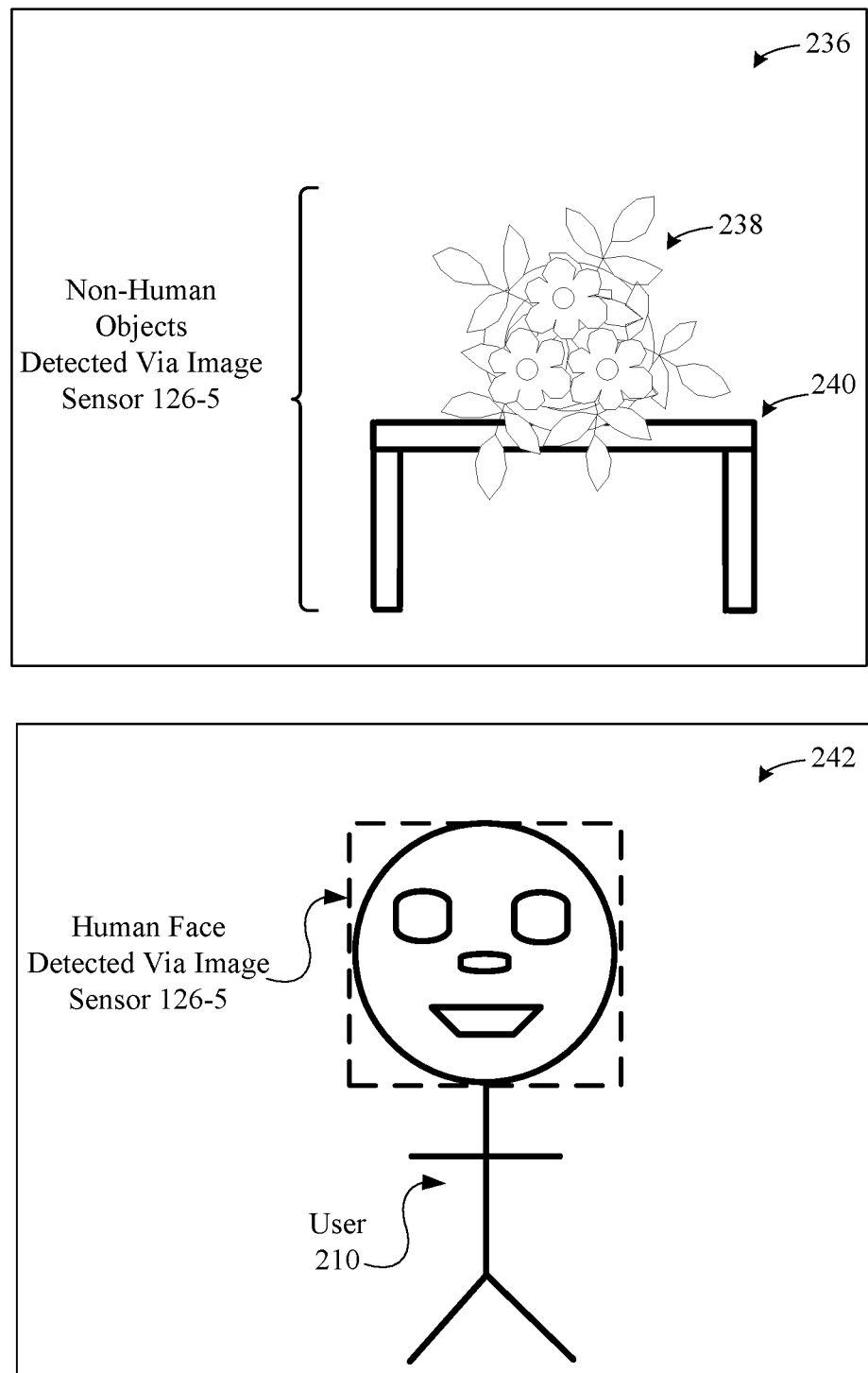

FIG. 2G presents different graphical illustrations of additional sensor/device data that can be efficiently used to perform user proximity detections, according to some embodiments. FIG. 2G continues the exemplary scenario described in FIG. 2F, in which the inconsistencies between the data produced by the accelerometer device 126-3 and the gyroscope device 126-4 resulted in the activation, by the sensor processing module 122, of the sensor group 206 to gather more data. As previously described herein, the image sensor 126-5 can be activated, by the sensor processing module 122 (not depicted in FIG. 2G), to gather additional data to determine whether the user 210 is approaching the computing device 102.

According to some embodiments, the image sensor 126-5 can use computer-implemented procedures that are configured to recognize facial features associated with a human. Facial features that can be recognized by the image sensor 126-5 can include, but are not limited to, human eyes, human noses, human mouths, and so on. With reference now to scene 236, depicted in FIG. 2E, during human face recognition detection procedures, the image sensor 126-5 can gather image data associated with a scene, which can be captured by a lens (not depicted in FIG. 2G) that is coupled to the image sensor 126-5. In this manner, the image sensor 126-5 can gather image data (e.g., pixel data) associated with a captured scene that can include multiple objects within the field of view of the lens. In this fashion, the image sensor 126-5 can detect both human objects as well as non-human objections in a given scene, such as a table 240 and a plant 238 depicted in the scene 236 captured by the image sensor 126-5.

In addition to the table 240 and the plant 238, non-human objects that can be detected by the image sensor 126-5 can include, but are not limited to, inanimate objects (e.g., curtains, doors, lamps, etc.), different types of animals (e.g., dogs, cats, birds, etc.), different types of insects, and so on. Image data collected by the image sensor 126-5 can then be communicated to the sensor processing module 122 for further processing. After analysis of the image data associated with the scene 236, collected by the image sensor 126-5, the sensor processing module 122 can determine that the failure to detect a human face in the scene 236 is consistent with the user 210 not approaching the computing device 102 and, thus, not likely to engage in use of the computing device 102. Accordingly, the sensor processing module 122 can store data associated with the determination in the SOC volatile memory 106-2.

Scene 242 in FIG. 2G depicts an alternative scenario in which image data produced by the image sensor 126-5 suggests that the user 210 is approaching the computing device 102. As illustrated in scene 242, the image sensor 126-5 can analyze image data to detect the presence of a human (e.g., user 210) who is proximate to the computing device 102. For example, the image sensor 126-5 can detect the face of the user 210 based on the eyes, nose and/or mouth of the user 210. In this fashion, the sensor processing module 122 can process the image data gathered by the image sensor 126-5 to determine that a detected face resembles a human face, thereby indicating a strong likelihood that a user is approaching the computing device 102 and, thus, likely to engage in use of the computing device 102 within a short period of time. Accordingly, the sensor processing module 122 can store data associated with the determination in the SOC volatile memory 106-2.

Figure 2H:
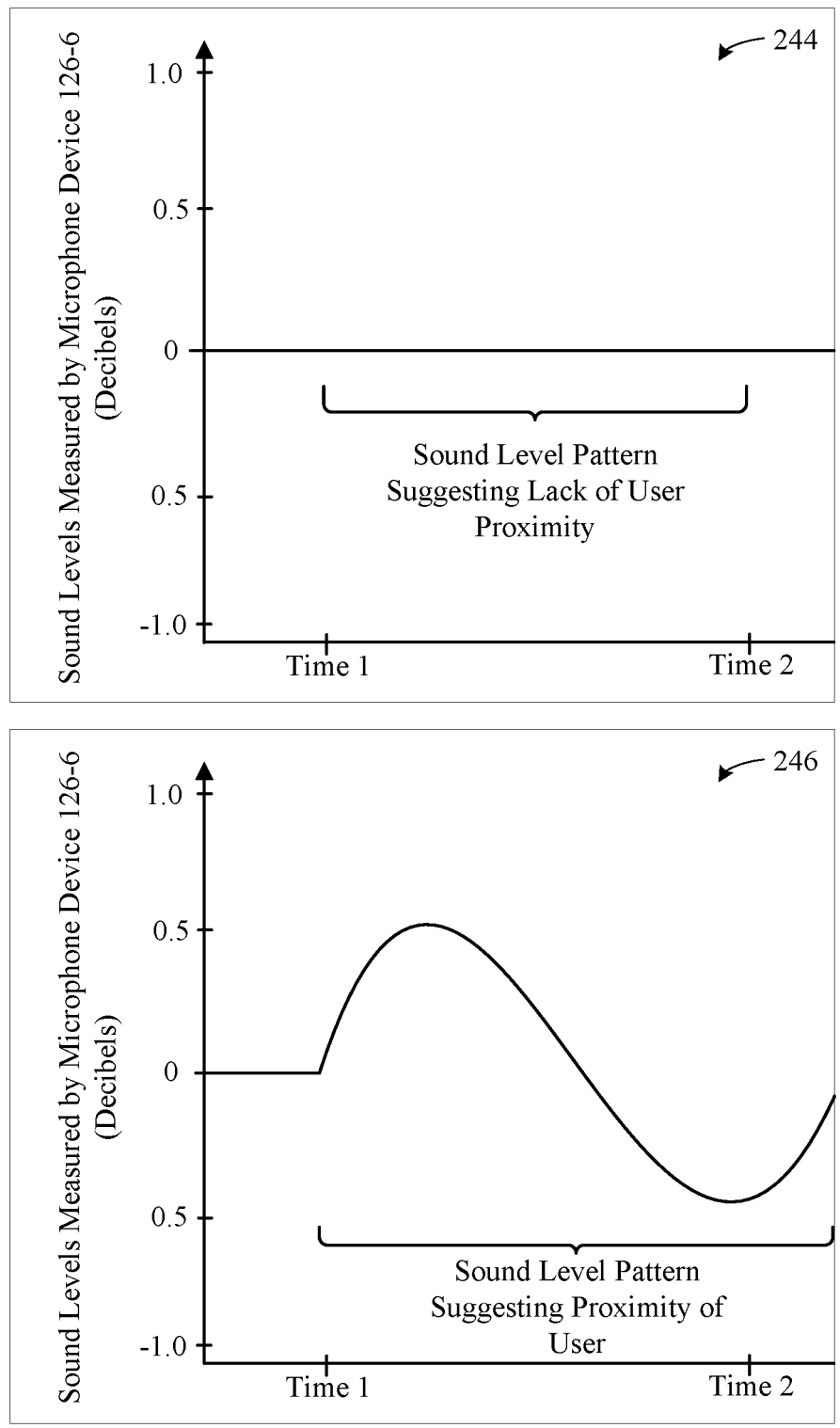

As will be depicted in greater detail in FIG. 2H, the sensor processing module 122 can selectively activate the microphone device 126-6 which is also associated with the sensor group 206, to gather more data to make a more informed decision as to whether the user 210 is approaching the computing device 102. Additionally, by specifically activating the microphone device 126-6, the sensor processing module 122 also minimizes the number of sensors/devices that are used for user proximity determinations by not activating additional sensors/devices included in other sensor groups, such as sensor groups 202 and 204, to gather data at this point, thereby promoting efficient power usage.

FIG. 2H presents different graphical illustrations of additional sensor/device data that can be efficiently used to detect the proximity of a user relative to the computing device 102, according to some embodiments. FIG. 2H continues the exemplary scenario described in FIG. 2G, in which the sensor processing module 122 activated the microscope device 126-6 to gather more data to verify that the user 210 is not approaching the computing device 102, as suggested by the data produced by the image sensor 126-5. As previously described herein, the microphone device 126-6 can be activated, by the sensor processing module 122 (not depicted in FIG. 2G), to gather additional data to determine whether the user 210 is approaching the computing device 102.

As illustrated in microphone graphical data 244 in FIG. 2H, along the y-axis, a sound data recorder (not depicted in FIG. 2E) coupled to the microphone 126-6 can measure the sound levels (e.g., in decibels) of sounds captured by the microphone 126-6 and, along the x-axis, collect the sound levels for any duration of time (e.g., milliseconds, seconds, minutes, and so on). It should be noted that although the sound data recorder described herein is referred to as a component separate to the microphone 126-6, embodiments support microphones with built-in sound data recording functionality. For simplicity purposes, the embodiments described herein that include a discussion of the microphone 126-6 refer to microphones that include the aforementioned built-in sound data recording functionality.

As depicted between times one (1) and two (2), the microphone device 126-6 can measure a constant level of sound (e.g., no sound detected), thereby indicating that the user 210 is likely not in proximity of the computing device 102. In this fashion, the sensor processing module 122 can determine that the non-linear nature of the measured sound level is consistent with the user 210 not approaching the computing device 102 and, thus, unlikely to engage in use of the computing device 102.

Accordingly, based on produced data, by both the image sensor 126-5 and the microphone 126-6, that each suggested that the user 210 is not approaching the computing device 102, the sensor processing module 122 can withhold the transmission of control signals sent to the power controller 112. For instance, according to some embodiments, the sensor processing module 122 can recognize that all of the sensors, included in the sensor group 206, produced data that suggested that the user 210 is not approaching the computing device 102. The recognition of this pattern, detected by the sensor processing module 122, can cause the sensor processing module 122 to predict that other sensors/devices would likely arrive at the same results as the image sensor 126-5 and the microphone device 126-6, had the sensors/devices been activated.

Based on recognition of the pattern, the sensor processing module 122 can conserve power resources by deactivating/not activating the sensors/devices included in sensor groups 202 and 204 to prevent them from performing any procedures until further instructions are provided by the sensor processing module 122. Accordingly, at this point, the sensor processing module 122 can determine that no additional data is required from any sensors/devices associated with the sensor groups 202 and 204. In this fashion, the sensor processing module 122 can withhold the transmission of control signals sent to the power controller 112, thereby causing the computing device 102 to remain with a current sleep state level.

Microphone graphical data 246 in FIG. 2H depicts an alternative scenario in which data produced by the microphone device 126-6 suggests that a user is proximate to the computing device 102. For example, as depicted between times one (1) and two (2) in the microphone graphical data 246 in FIG. 2H, the data collected by the microphone device 126-6 can indicate that the sound level values can begin to oscillate between approximately the −0.5 and 0.5 decibel range. In this manner, the increased level of sound can be indicative of a user moving towards the computing device 102 to engage in use of the computing device 102. For example, according to some embodiments, the computing device 102 can be configured, through installed software (e.g., Apple Inc.'s Siri®), to perform various operations in response to voice commands received via the microphone 126-6. Additionally, the increased sound levels can be indicative of doors closing or other hints that a user is proximate to the computing device 102 and, thus, likely to engage in use of the computing device 102 within a short period of time. In this fashion, the sensor processing module 122 can determine that the sudden change in sound level is consistent with a user approaching the computing device 102 to engage in use of the computing device 102. Accordingly, the sensor processing module 122 can store data associated with the results of determinations made with respect to the user approaching the computing device 102 in the SOC volatile memory 106-2.

Given the inconsistencies in the data suggested by the image sensor 126-5 (which produced data that suggested that the user 210 is not approaching the computing device 102) and the data suggested by the microphone device 126-6, the sensor processing module 122 can decide to reference a calculated confidence score to determine whether control signals should be sent to the power controller 112 (not depicted in FIG. 2H). The control signals, sent from the sensor processing module 122 to the power controller 112, can cause the current sleep state level of the computing device 102 to be adjusted to a higher-power sleep state.

In this fashion, the sensor processing module 122 can be configured to make determinations based on a calculation of the various contributions provided by each sensor/device associated with the sensor cluster 126 during the performance of the various user proximity detection procedures described herein. Provided a confidence threshold is met by the confidence score calculated by the sensor processing module 122, the sensor processing module 122 can correspondingly send control signals to the power controller 112 that can cause the computing device 102 to have a current sleep state adjusted to a higher-power sleep state. Conversely, provided the confidence threshold is not met by the confidence score, the sensor processing module 122 can correspondingly withhold the transmission of control signals sent to the power controller 112.

In a scenario in which the data produced by both the image sensor 126-5 and the microphone device 126-6 suggests that the user 210 is approaching the computing device 102, according to some embodiments, the sensor processing module 122 can correspondingly send control signals to the power controller 112 (not depicted in FIG. 2D) that can cause the computing device 102 to have a current sleep state adjusted to a higher-power sleep state. According to some embodiments, the adjustment to the higher-power sleep state can supply sufficient power to the power controller 112 to enable one or more components executing within the volatile memory 106-1 (not depicted in FIG. 2D) to perform a corresponding operation.

For example, according to some embodiments, the operating system 108-1 can be configured to use the image data calculated by the image sensor 126-5 to automatically log in the user 210, whose face was detected during the user proximity detection procedures described herein, to one or more applications executed on the computing device 102 (and operating in a suspended state during sleep operations performed by the computing device 102). According to some embodiments, the operating system 108-1 can be configured to use the voice data captured by the microphone device 126-6 to perform various operations in response to voice commands received via the microphone 126-6.

According to some embodiments, the sound data captured by the microphone device 126-6 can be used by one or more applications (e.g., Apple Inc.'s Siri®), that operate in a suspended state during sleep operations performed by the computing device 102. For example, sound data captured by the microphone device 126-6 during the procedures described herein can be used to remote one or more applications from a current sleep state to a fully-operational state.

It should be noted that, according to some embodiments, the manner in which sensor groups are determined can vary. For example, according to some embodiments, each sensor/device associated with the sensor cluster 126 can individually represent an entire sensor group (e.g., the proximity sensor 126-1 can wholly represent sensor group 202, the light sensor 126-2 can wholly represent sensor group 204, and so on). Additionally, it should be noted that the manner in which the various sensors/devices within the sensor groups 202, 204 and 206 are activated in the described embodiments are merely exemplary and can be activated according to a pre-determined logic implemented into the sensor processing module 122. Furthermore, according to some embodiments, the sensor processing module 122 can be configured to resume the performance of the user proximity detection procedures described herein, even after the withholding/transmitting of control signals sent to the power controller 112. For example, according to some embodiments, the sensor processing module 122 can be configured to wait for a pre-determined period of time before resuming the performance of the user proximity detection procedures described herein, after the withholding/transmitting of control signals sent to the power controller 112.

Figure 2I:
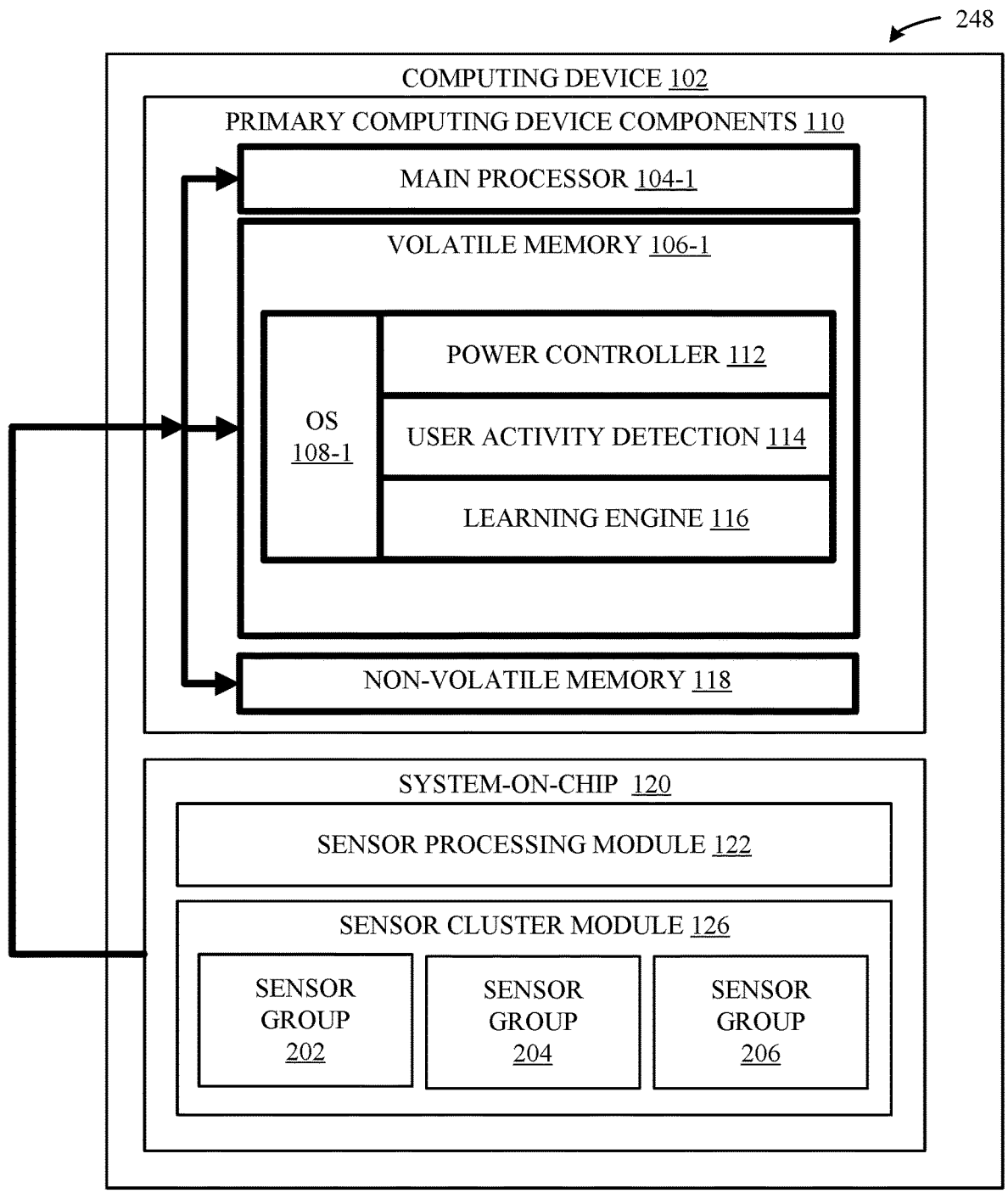

FIG. 2I illustrates how primary components residing with the computing device 102 can be restored to a high-power sleep state based on procedures performed by the sensor processing module 122, according to some embodiments. FIG. 2I depicts a higher-power sleep state adjustment procedure 248, performed by the sensor processing module 122, based on the performance of the user proximity detection procedures described herein and/or a pre-determined confidence threshold level being met. As depicted by the bolded arrows pointing in the direction from the SOC 120 to the power controller 112, the sensor processing module 122 can send control signals to the power controller 112, which correspondingly adjusts the computing device 102 to have a current sleep state adjusted to a higher-power sleep state by powering primary components 110 of computing device 102 individually (e.g., the main processor 104-1, the volatile memory 106-1 and/or the non-volatile memory 118). As depicted in FIG. 2I, according to some embodiments, the individual components of the volatile memory 106-1 (e.g., the power controller 112, the user activity detector 114, and the learning engine 116) can be enabled to resume operations that were suspended during the previous lower-power state. Accordingly, the power controller 112 and the volatile memory 106-1 can be supplied with sufficient power to perform their respective functions which, as will be discussed in greater detail in FIGS. 3A-3D, can enable the computing device 102 to gather/analyze more data gathered in order to perform additional sleep state adjustment procedures, according to some embodiments.

Figure 3A:
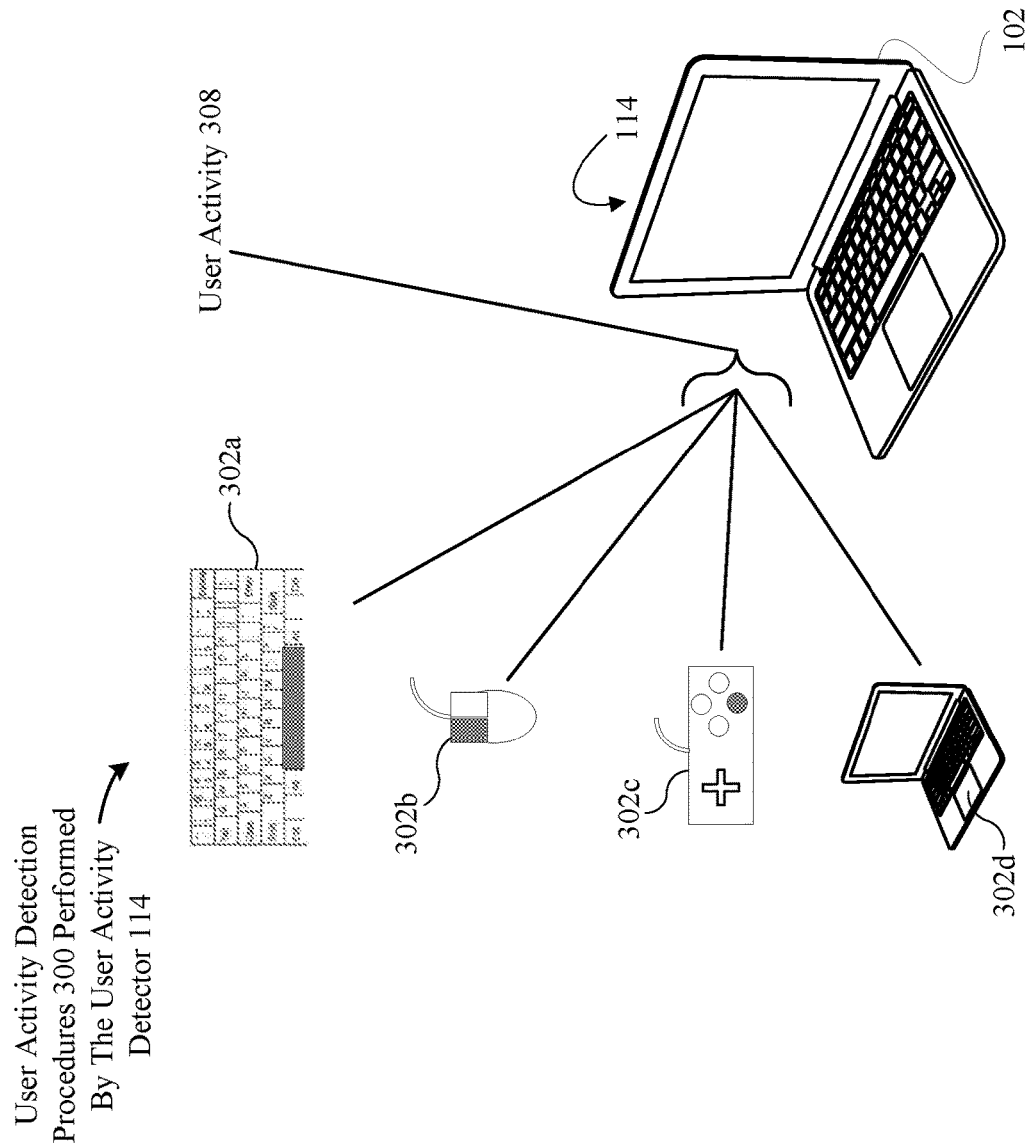
FIGS. 3A-3D illustrate graphical representations of data gathered and analyzed to perform sleep state adjustment procedures, according to some embodiments.

FIG. 3A illustrates an example of user activity detection procedures performed during a sleep state adjustment determination, according to some embodiments. As depicted during user activity detection procedures 300 performed in FIG. 3A, the computing device 102 can detect user activity 308, via the user activity detector 114 (depicted as installed within the computing device 102), which can be in the form of a number of different user input types capable of being received and processed by the computing device 102. For instance, the computing device 102 can detect a user providing input to the computing device 102 through a wired or wireless keyboard (e.g., keyboard 302a). In another example, the computing device 102 can detect a user providing input to the computing device 102 through a wired or wireless mouse (e.g., mouse 302b).

In another example, the computing device 102 can detect a user providing input to the computing device 102 through a wired or wireless gamepad (e.g., gamepad 302c). In yet another example, the computing device 102 can detect a user providing input to the computing device 102 through a touch sensitive panel (e.g., panel 302d) or touch-sensitive display. According to some embodiments, the computing device 102 can detect a user providing input to the computing device 102 remotely through secure shell ("SSH") computing procedures (not depicted in FIG. 3A) or similar procedures. It should be noted that the embodiments of the present invention are not limited to the user input types illustrated in FIG. 3A and can include additional types of user input capable of being received and processed by the computing device 102.

Figure 3B:
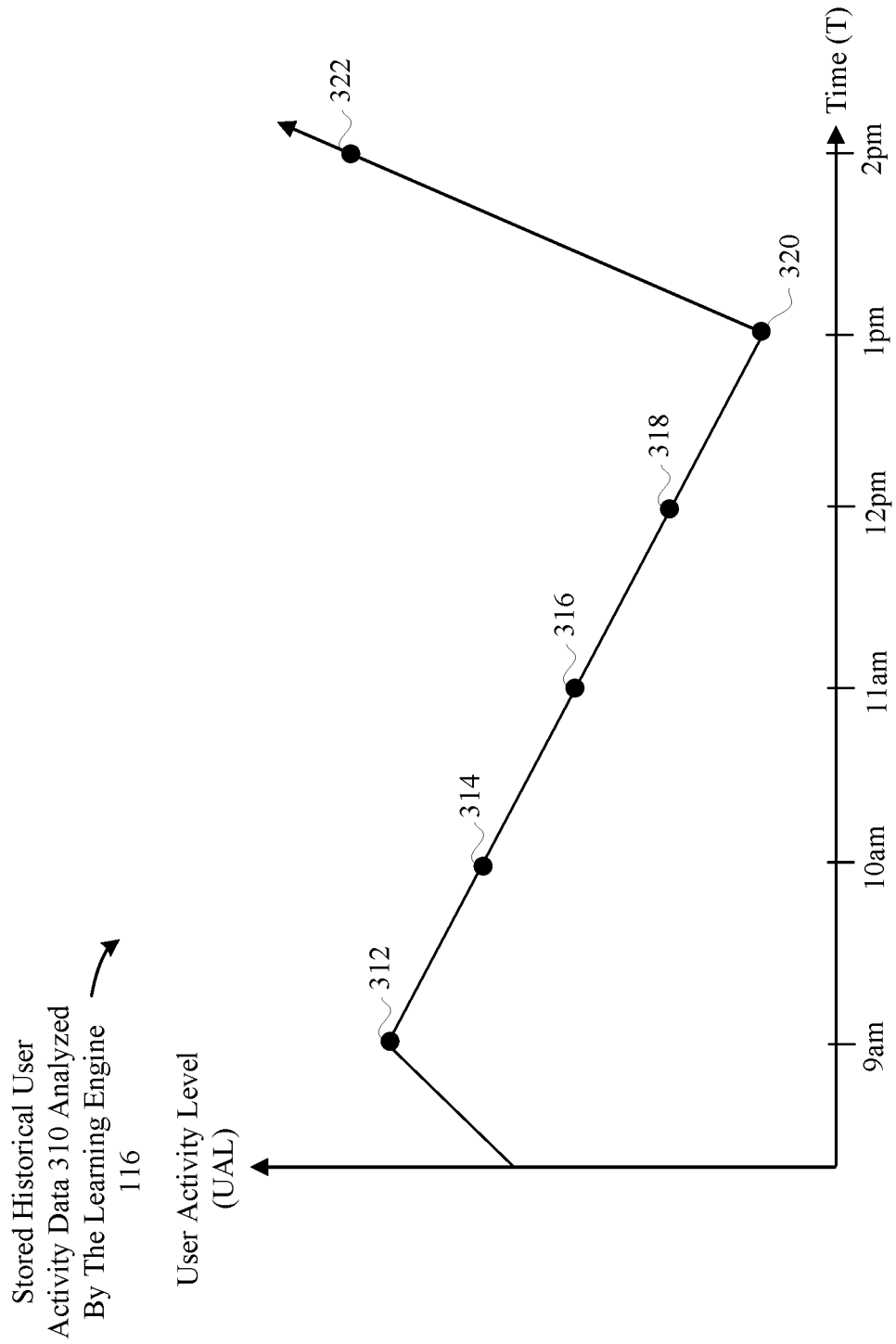

With reference now to the graphical illustration depicted in FIG. 3B, while the computing device 102 operates within an awake state, the computing device 102 (via the learning engine 116) can be configured to analyze stored data related to historical user activity involving the use of the computing device 102. Historical user activity data (e.g., stored historical user activity data 310) stored by the computing device 102 can include user usage patterns performed on the computing device 102 over a period of time (e.g., several days, months, years, and so on). User usage patterns can include activities or events in which the user directly engages the computing device 102 and that occur with a certain degree of regularity in a manner that allows the computing device 102 to accurately predict a future occurrence of the particular user activity. User activities can include the use of the various input devices described herein (e.g., user activity 308) as well as inputs received by the computing device 102 remotely (e.g., SSH procedures). According to some embodiments, historical user activity data can be stored within memory resident on computing device 102.

FIG. 3B depicts a scenario in which the learning engine 116 analyzed data gathered/stored over the course of several months. It should be noted that the user activity level (UAL) depicted in FIG. 3B can be a measurement in the frequency of user-initiated activity performed on the computing device 102. Using the stored historical user activity data 310 depicted in FIG. 3B, the learning engine 116 can determine a user's general usage pattern of the computing device 102 during any given day (e.g., usage pattern between 9 am and 2 pm, which corresponds with times 312, 314, 316, 318, 320, and 322, respectively). For example, as illustrated in FIG. 3B, the stored historical user activity data 310 can be processed in a manner such that the computing device 102 can accurately determine times of the day in which user activity involving the use of the computing device 102 typically begins to decrease (e.g., time 312 which corresponds to approximately 9 am) as well as when usage typically begins to increase (e.g., time 320 which corresponds to approximately 1 pm). As will be described in greater detail herein, the stored historical user activity data 310 can be used to schedule the issuance of both "light" sleep signals and "deep" sleep signals to adjust a current sleep state level of the computing device 102.

Figure 3C:
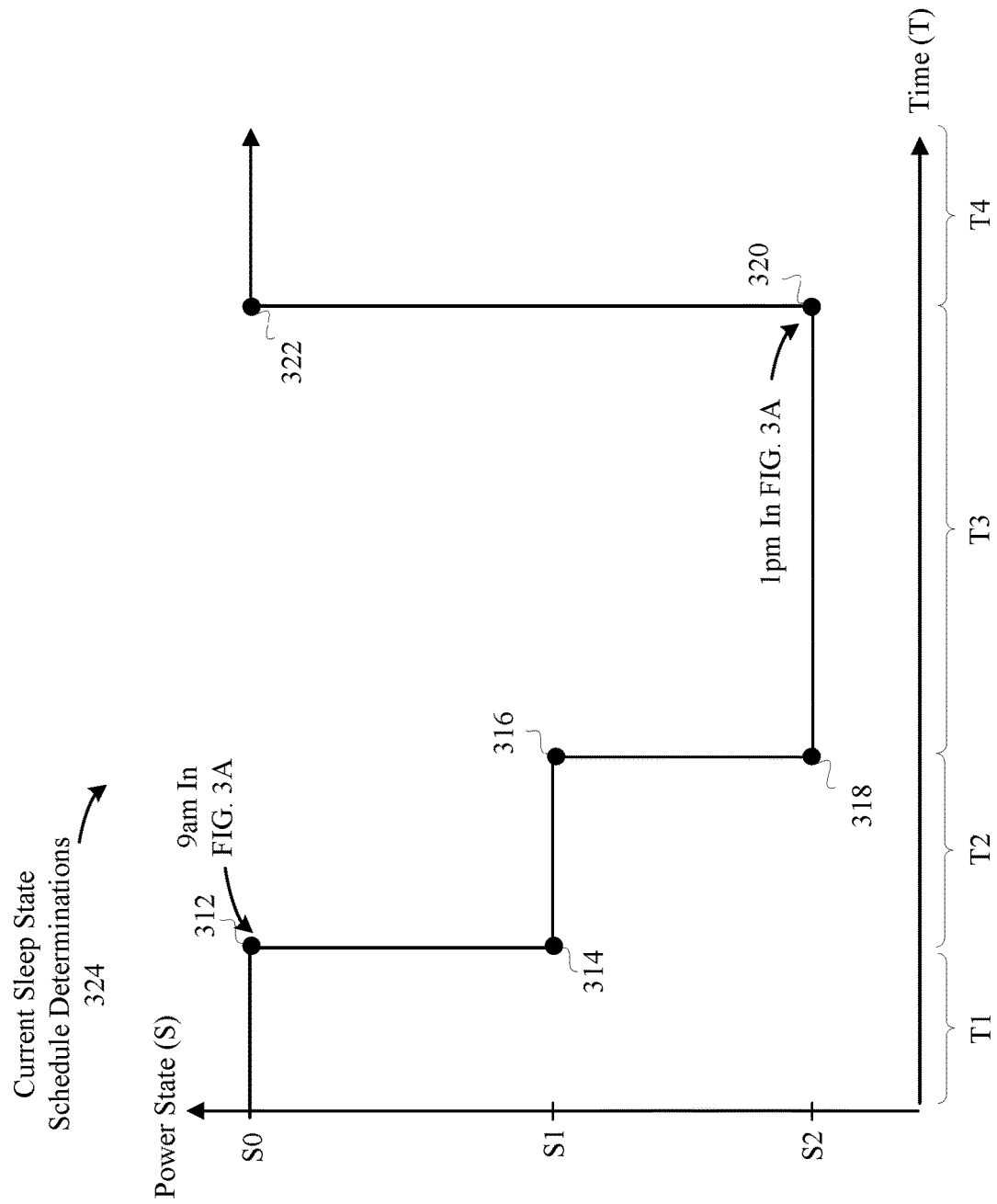

FIG. 3C depicts a graphical illustration of how sleep state operations are performed by the computing device 102, prior to the enactment of the sleep state adjustment procedures described herein. As depicted in the current sleep state schedule determinations 324 in FIG. 3C, the computing device 102 can enter a number of different computing states, "S0" to "S2," during times 312, 314, 316, 318, 320, and 322. State (S0) can represent a fully-functional or "awake" computing state in which the computing device 102 operates in a fully-operational mode such that its resident components are sufficiently powered to fully perform their respective functions.

Sleep state (S1) can represent a sleep state in which the computing device 102 operates within a low-power mode such that components resident within the computing device 102 are supplied with a decreased amount of power relative to an awake computing state. Placing the computing device 102 within sleep state (S1) causes the computing device 102 to save a smaller amount of power relative to sleep state (S2) (which will discussed in greater detail herein) while allowing the computing device 102 to be restored to an awake state in a shorter period of time relative to sleep state (S2).

Sleep state (S2) can represent a deeper sleep state or "standby" mode in which the computing device 102 operates within an even lower power mode relative to sleep state (S1) such that components residing within the computing device 102 are supplied with minimal power such that the computing device 102 approaches being completely placed within "powered off" state. Placing the computing device 102 within sleep state (S2) allows the computing device 102 to achieve the highest possible power savings relative to sleep state (S1) at the cost of requiring a greater amount of time to restore the computing device 102 to an awake state relative to sleep state (S1).

As depicted in FIG. 3C during the T1 time period, the computing device 102 operates within the (S0) computing state. During a later phase of the T1 period, the computing device 102 can experience a period of inactivity in which a user may not be actively engaging the computing device 102. Thus, during this later phase of the T1 period, a sleep state policy executed by the computing device 102 can execute local sleep operations such that the computing device 102 begins to operate within the (S1) sleep state towards the end of the T1 period.

During the T2 time period, the computing device 102 continues to operate within the (S1) sleep state. During this period, the computing device 102 saves a smaller amount of power relative to the (S2) sleep state during the T2 time period while enabling the computing device 102 to be able to restore itself to the (S0) computing state in a shorter period of time relative to the (S2) sleep state. During a later phase of the T2 period, the computing device 102 can experience a period of continued inactivity in which a user may still not be engaging the computing device 102. Thus, during this later phase of the T2 period, the sleep state policy executed by the computing device 102 can further engage local sleep operations such that the computing device 102 begins to operate within a "deeper" sleep state, (S2), towards the end of the T2 period.

During the T3 time period, the computing device 102 continues to operate within the (S2) sleep state. During this period, the computing device 102 saves a highest amount of power relative to the (S1) sleep state at the expensive of the computing device 102 requiring a greater amount of time to restore itself to the (S0) computing state relative to the amount of time that would be required when it was operating within the (S1) sleep state. As illustrated in FIG. 3C, during a later phase of the T3 period, the computing device 102 can begin to experience a period of renewed user activity in which the user begins to re-engage the computing device 102 once again. Thus, during this later phase of the T3 period, the sleep state policy executed by the computing device 102 can initialize operations that remove the computing device 102 from the (S2) sleep state and restore itself to an awake (S0) computing state at the beginning of the T4 period.

Figure 3D:
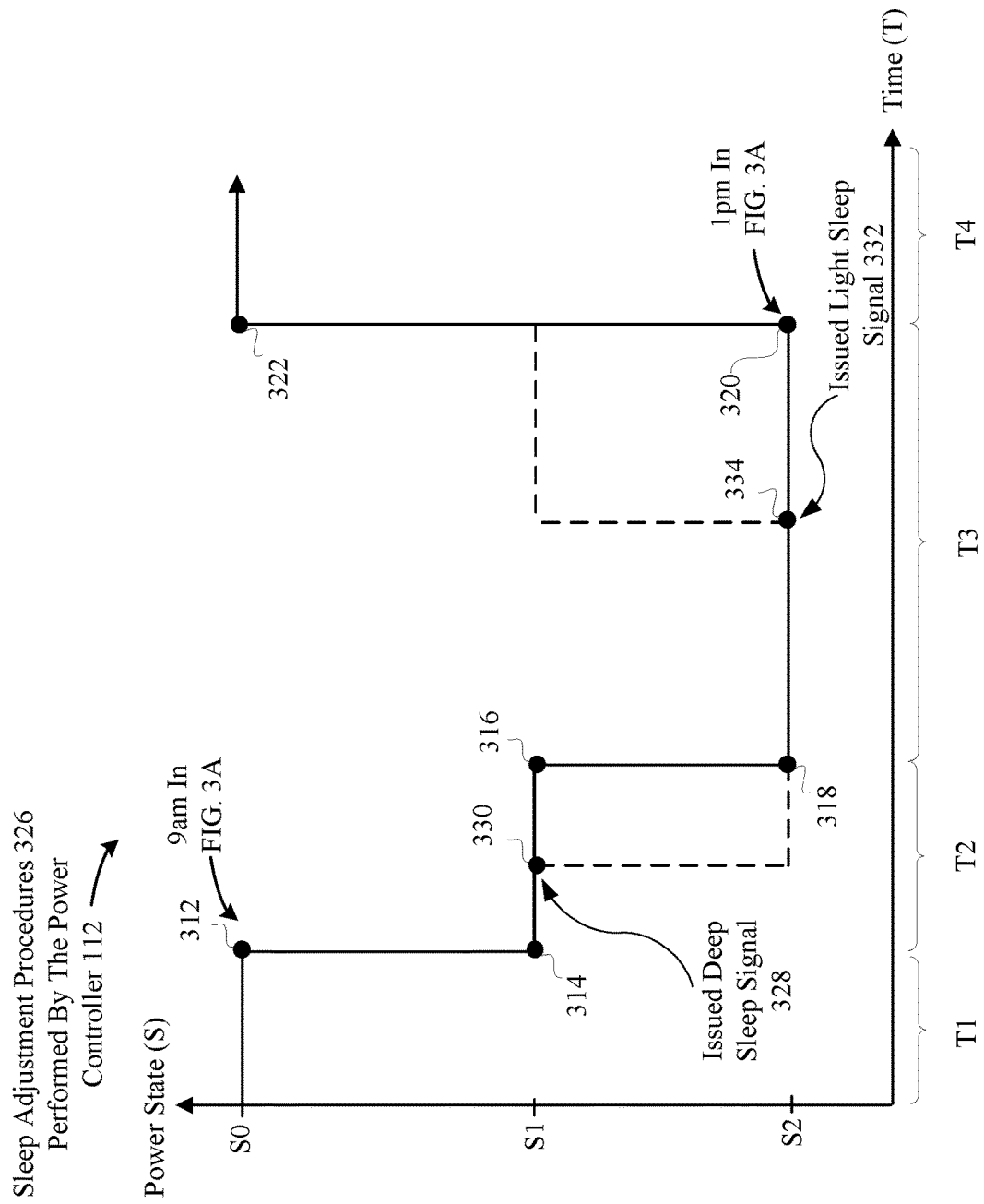

FIG. 3D depicts a graphical illustration of how the computing device 102 can use stored historical user activity data to schedule and issue deep sleep and light sleep signals that adjust sleep states, according to some embodiments. Using, the learning engine 116 (not depicted in FIG. 3D), the computing device 102 can correlate typical user usage patterns gathered from the historical user activity data accumulated over a period of time (e.g., stored historical user activity data 310 in FIG. 3B) with the scheduling of deep sleep signals (e.g., deep sleep signal 328) and light sleep signals (e.g., light sleep signal 332).

As depicted by the sleep adjustment procedures 326 illustrated in FIG. 3D, the deep sleep and light sleep signals can be issued, via the power controller 112, in accordance with a scheduled time. As depicted in FIG. 3D, the power controller 112 can schedule the issuance of the deep sleep signal 328 at a time, time 330 (e.g., 10:30 am in FIG. 3B), which occurs between times 314 (e.g., 10 am in FIG. 3B) and 316 (e.g., 11 am in FIG. 3B). Accordingly, time 330 can be recognized as a time in which the computing device 102 typically experiences decreased user activity (based on historical user activity data gathered) and in which the computing device 102 typically operates within a (S1) sleep state. As such, with further reference to FIG. 3D, the deep sleep signal 328 can be issued by the power controller 112 to immediately decrease the amount of power supplied to one or more components of the computing device 102, thereby causing the computing device 102 to immediately enter the (S2) computing state at time 330.

By placing the computing device 102 into the (S2) sleep state in this manner, the computing device 102 can reside in a lowest possible sleep state (e.g., "standby" mode) for a larger portion of the T2 period, whereas prior to the scheduling of deep sleep signal 328, the computing device 102 would have continued to operate within the (S1) computing state for the entire duration of the T2 period (as depicted by the solid lines between the times 314 and 316 in FIG. 3D). In this fashion, through the use of the scheduling procedures described herein, the computing device 102 can use historical user activity data gathered over time to accurately predict a time period in which the user will likely not use the computing device 102 and intelligently decrease the amount of power it can save during that time period.

Additionally, as illustrated in FIG. 3D, the power controller 112 can schedule the issuance of the light sleep signal 332 at time 334 (e.g., 12:30 pm in FIG. 3B), which occurs between times 318 (e.g., 12 pm in FIG. 3B) and 320 (e.g., 1 pm in FIG. 3B). Accordingly, time 334 can be recognized as a time in which the computing device 102 typically experiences continued inactivity (based on historical user activity data gathered) and a time in which the computing device 102 typically remains in the (S2) sleep state. As such, with further reference to FIG. 3D, the light sleep signal 332 can be issued to instruct resident power resources of the computing device 102 to immediately increase the amount of power supplied to one or more components of the computing device 102, thereby causing the computing device 102 to immediately enter the (S1) sleep state at time 334.

By placing the computing device 102 into the (S1) sleep state in this manner, the computing device 102 can operate in a high-power sleep state for larger portion of the T3 period, whereas prior to the scheduling of the light sleep signal 332, the computing device 102 would have continued to operate within the S2 computing state for the entire duration of the T3 period (as depicted by the solid lines between times 318 and 320 in FIG. 3D). In this fashion, through the use of the scheduling procedures described herein, the computing device 102 can use historical user activity data gathered over time to accurately predict a time period in which the user will likely use the computing device 102. The issuance of the light sleep signal 332 advantageously increases the amount of power supplied to the computing device 102 at point just prior to the predicted user activity. Accordingly, the computing device 102 can be quickly restored to the (S0) computing state and become fully-functional in less time.

Figure 4A:
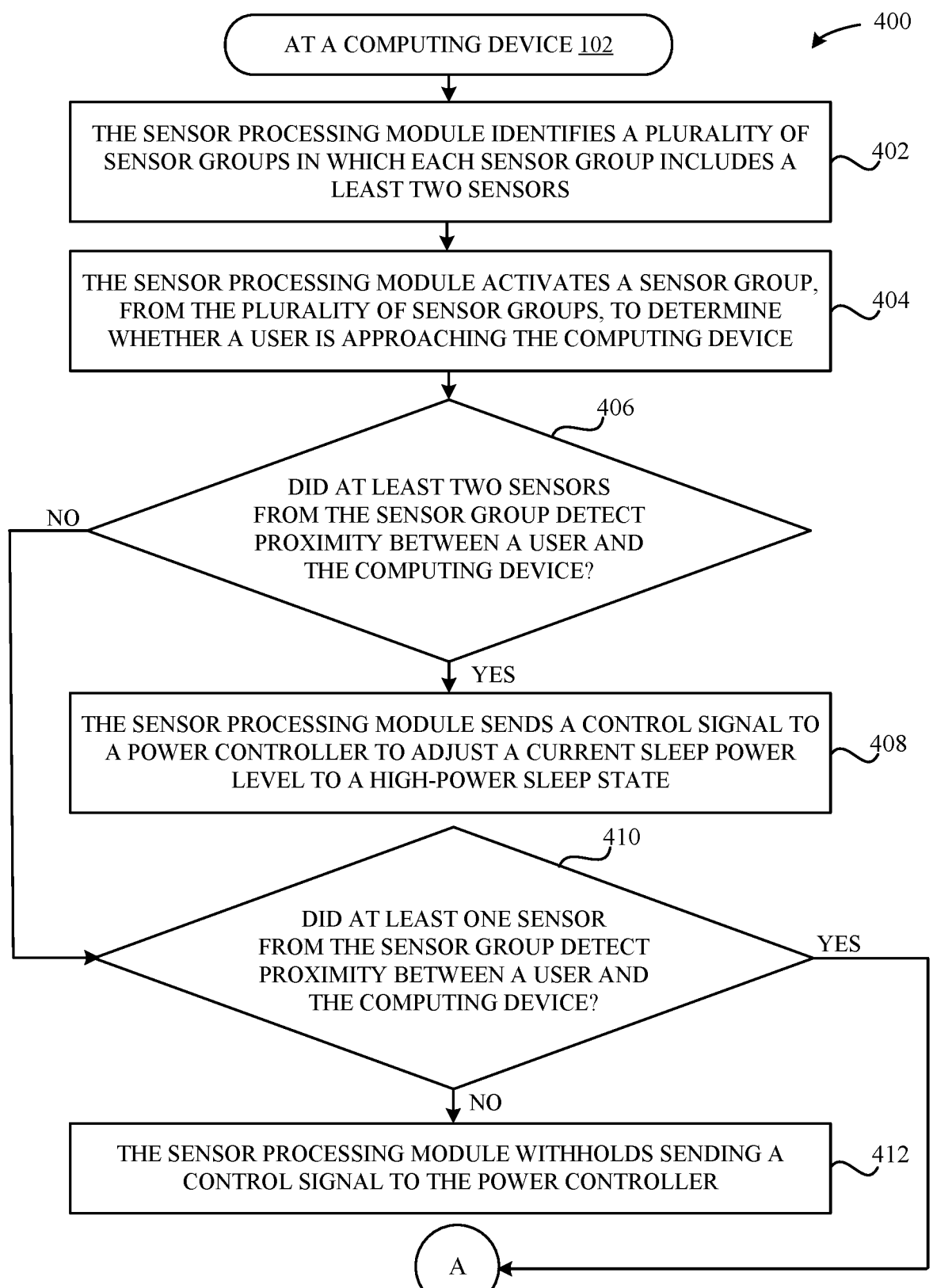
FIGS. 4A-4B illustrate a method for adjusting sleep states of a computing device using onboard sensors coupled to the computing device, according to some embodiments.

FIG. 4A illustrates a method 400 for adjusting computing sleep states using onboard sensors, as described herein according to some embodiments. It should be noted that the steps described herein generally occur when the computing device 102 is operating within a sleep state. Sleep states include, for example and as described herein, low-power sleep states as well as high-power sleep states. As shown in FIG. 4A, the method 400 can be implemented by the computing device 102, and begins at step 402, where the sensor processing module identifies a plurality of sensor groups in which each sensor group includes at least two sensors. Next, at step 404, the sensor processing module activates a sensor group, from the plurality of sensor groups, to determine whether a user is approaching the computing device 102. Next, at step 406, the sensor processing module determines whether at least two sensors from the sensor group detect proximity between a user and the computing device 102. If the sensor processing module determines that at least two sensors from the sensor group detected proximity between a user and the computing device 102, then the sensor processing module sends a control signal to a power controller to adjust a current sleep power level to a high-power sleep state, as described in step 408. Otherwise, the sensor processing module next determines whether at least one sensor from the sensor group detected proximity between a user and the computing device 102, as described in step 410.

Figure 4B:
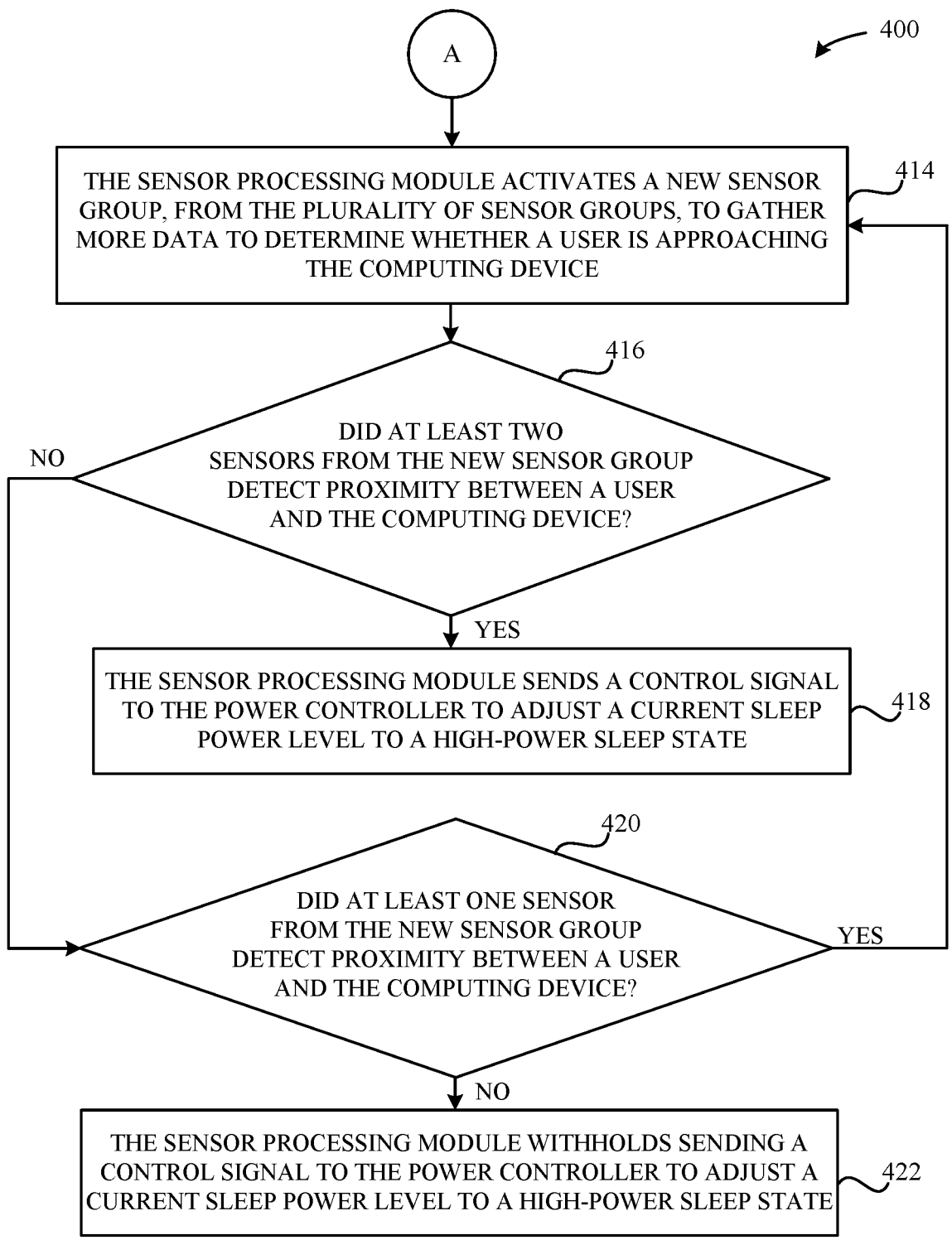

Next, at step 410, the sensor processing module next determines whether at least one sensor from the sensor group detected proximity between a user and the computing device 102. If the sensor processing module determines that at least one sensor from the sensor group detected proximity between a user and the computing device 102, then the sensor processing module activates a new sensor group, from the plurality of sensor groups, as described in step 414 in FIG. 4B. Otherwise, the sensor processing module withholds sending a control signal to the power controller, as described in step 412. Next, at step 414 in FIG. 4B, given that the sensor processing module determined that at least one sensor from the sensor group detected proximity between a user and the computing device 102, the sensor processing module activates a new sensor group, from the plurality of sensor groups, to gather more data to determine whether a user is approaching the computing device 102.

Next, at step 416, the sensor processing module determines whether at least two sensors from the new sensor group detected proximity between a user and the computing device 102. If at least two sensors from the new sensor group detected proximity between a user and the computing device 102, the sensor processing module sends a control signal to the power controller to adjust a current sleep power level to a high-power sleep state, as described in step 418. Otherwise, the sensor processing module determines whether at least one sensor from the new sensor group detected proximity between a user and the computing device 102, as described in step 420. Next, at step 420, the sensor processing module next determines whether at least one sensor from the new sensor group detected proximity between a user and the computing device 102. If the sensor processing module determines that at least one sensor from the new sensor group detected proximity between a user and the computing device 102, then the sensor processing module activates a new sensor group, from the plurality of sensor groups, as described in step 414. Otherwise, the sensor processing module withholds sending a control signal to the power controller, as described in step 422.

FIG. 5 illustrates a detailed view of a computing device 500 that can be used to implement the various components described herein, according to some embodiments. In particular, the detailed view illustrates various components that can be included in the computing device 102 illustrated in FIG. 1. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also include the storage device 540, which can comprise a single disk or a collection of disks (e.g., hard drives), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of applications executing on the computing device 102, including the power controller 112, the user activity detector 114, the learning engine 116, and the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for adjusting sleep states of a computing device based on a usage profile of the computing device, the method comprising, at the computing device:
    monitoring usage levels of the computing device over a period of time to establish the usage profile;
    in response to identifying, based on the usage profile, that the computing device is likely to be utilized within a first period of time:
        scheduling the computing device to transition, at a first time prior to a start of the first period of time, from a low-power sleep state into a higher-power sleep state; and
    in response to identifying that the computing device has transitioned from the low-power sleep state into the higher-power sleep state prior to the first time:
        cancelling the scheduling of the computing device to transition from the low-power sleep state into the higher-power sleep state.

2. The method of claim 1, further comprising, in response to identifying, based on the usage profile, that the computing device is unlikely to be utilized within a second period of time:
    scheduling the computing device to transition, at a second time subsequent to a start of the second period of time, from the higher-power sleep state into the low-power sleep state.

3. The method of claim 2, further comprising, in response to identifying that the computing device is being utilized between the start of the second period of time, but subsequent to the second time:
    cancelling the scheduling of the computing device to transition from the higher-power sleep state into the low-power sleep state.

4. The method of claim 3, further comprising:
    updating the usage profile to reflect cancelling the scheduling.

5. The method of claim 1, wherein the low-power sleep state comprises a lowest-power sleep state of the computing device.

6. The method of claim 1, further comprising:
    updating the usage profile to reflect cancelling the scheduling.

7. The method of claim 1, wherein monitoring usage levels of the computing device comprises analyzing obtaining at least one of the following inputs:
    keyboard input,
    mouse input,
    gamepad input,
    touch-sensitive surface input, or
    network input.

8. The method of claim 1, wherein the low-power sleep state causes the computing device to function in a mode in which at least one component included in the computing device is supplied with less a decreased amount of power relative to that which is supplied to the at least one component when the computing device is in an awake state.

9. At least one non-transitory computer readable storage medium configured to store instructions that, when executed by at least one processor included in a computing device, cause the computing device to adjust sleep states based on a usage profile of the computing device, by carrying out steps that include:
monitoring usage levels of the computing device over a period of time to establish the usage profile;
in response to identifying, based on the usage profile, that the computing device is likely to be utilized within a first period of time:
scheduling the computing device to transition, at a first time prior to a start of the first period of time, from a low-power sleep state into a higher-power sleep state; and
in response to identifying that the computing device has transitioned from the low-power sleep state into the higher-power sleep state prior to the first time:
cancelling the scheduling of the computing device to transition from the low-power sleep state into the higher-power sleep state.

10. The at least one non-transitory computer readable storage medium of claim 9, wherein the steps further include, in response to identifying, based on the usage profile, that the computing device is unlikely to be utilized within a second period of time:
scheduling the computing device to transition, at a second time subsequent to a start of the second period of time, from the higher-power sleep state into the low-power sleep state.

11. The at least one non-transitory computer readable storage medium of claim 10, wherein the steps further include, in response to identifying that the computing device is being utilized between the start of the second period of time, but subsequent to the second time:
cancelling the scheduling of the computing device to transition from the higher-power sleep state into the low-power sleep state.

12. The at least one non-transitory computer readable storage medium of claim 9, wherein the low-power sleep state comprises a lowest-power sleep state of the computing device.

13. The at least one non-transitory computer readable storage medium of claim 9, wherein monitoring usage levels of the computing device comprises analyzing obtaining at least one of the following inputs:
keyboard input,
mouse input,
gamepad input,
touch-sensitive surface input, or
network input.

14. The at least one non-transitory computer readable storage medium of claim 9, wherein the low-power sleep state causes the computing device to function in a mode in which at least one component included in the computing device is supplied with less a decreased amount of power relative to that which is supplied to the at least one component when the computing device is in an awake state.

15. A computing device configured to adjust sleep states of based on a usage profile of the computing device, the computing device comprising:
at least one processor; and
at least one memory storing instructions that, when executed by the at least one processor, cause the computing device to perform steps that include:
monitoring usage levels of the computing device over a period of time to establish the usage profile;
in response to identifying, based on the usage profile, that the computing device is likely to be utilized within a first period of time:
scheduling the computing device to transition, at a first time prior to a start of the first period of time, from a low-power sleep state into a higher-power sleep state; and
in response to identifying that the computing device has transitioned from the low-power sleep state into the higher-power sleep state prior to the first time:
cancelling the scheduling of the computing device to transition from the low-power sleep state into the higher-power sleep state.

16. The computing device of claim 15, wherein the steps further include, in response to identifying, based on the usage profile, that the computing device is unlikely to be utilized within a second period of time:
scheduling the computing device to transition, at a second time subsequent to a start of the second period of time, from the higher-power sleep state into the low-power sleep state.

17. The computing device of claim 16, wherein the at least one processor further causes the computing device to perform steps that include, in response to identifying that the computing device is being utilized between the start of the second period of time, but subsequent to the second time:
cancelling the scheduling of the computing device to transition from the higher-power sleep state into the low-power sleep state.

18. The computing device of claim 15, wherein the comprises a lowest-power sleep state of the computing device.

19. The computing device of claim 15, wherein monitoring usage levels of the computing device comprises analyzing obtaining at least one of the following inputs:
keyboard input,
mouse input,
gamepad input,
touch-sensitive surface input, or
network input.

20. The computing device of claim 15, wherein the low-power sleep state causes the computing device to function in a mode in which at least one component included in the computing device is supplied with less a decreased amount of power relative to that which is supplied to the at least one component when the computing device is in an awake state.

* * * * *

UNITED STATES PATENT AND TRADEMARK OFFICE
CERTIFICATE OF CORRECTION

PATENT NO. : 11,216,054 B2
APPLICATION NO. : 16/578132
DATED : January 4, 2022
INVENTOR(S) : Joshua P. de Cesare et al.

It is certified that error appears in the above-identified patent and that said Letters Patent is hereby corrected as shown below:

In the Claims

In Claim 18, Column 30, Line 42-43: "comprises a lowest-power sleep state of the computing device." should read -- low-power sleep state comprises a lowest-power sleep state of the computing device. --.

Signed and Sealed this
Fourth Day of July, 2023

Katherine Kelly Vidal
Director of the United States Patent and Trademark Office